US012726799B2

(12) United States Patent
Vadivelu et al.

(10) Patent No.: US 12,726,799 B2
(45) Date of Patent: Sep. 1, 2026

(54) SYSTEMS AND METHODS FOR MITIGATING VEHICLE POSE ERROR ACROSS AN AGGREGATED FEATURE MAP

(71) Applicant: Aurora Operations, Inc., Pittsburgh, PA (US)

(72) Inventors: Nicholas Baskar Vadivelu, Markham (CA); Mengye Ren, Toronto (CA); Xuanyuan Tu, Milton (CA); Raquel Urtasun, Toronto (CA); Jingkang Wang, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/886,553

(22) Filed: Sep. 16, 2024

(65) Prior Publication Data

US 2025/0016534 A1 Jan. 9, 2025

Related U.S. Application Data

(63) Continuation of application No. 17/150,998, filed on Jan. 15, 2021, now Pat. No. 12,127,085.

(Continued)

(51) Int. Cl.
*H04W 4/46* (2018.01)
*B60W 60/00* (2020.01)

(Continued)

(52) U.S. Cl.
CPC ........ *H04W 4/46* (2018.02); *B60W 60/00272* (2020.02); *B60W 60/00276* (2020.02);

(Continued)

(58) Field of Classification Search
CPC ............. H04W 4/46; B60W 60/00272; B60W 60/00276; G05D 1/246; G05D 1/81;

(Continued)

(56) References Cited

U.S. PATENT DOCUMENTS

| | | | |
|---|---|---|---|
| 10,282,861 | B2 | 5/2019 | Kwant |
| 2015/0228077 | A1 | 8/2015 | Menashe |

(Continued)

FOREIGN PATENT DOCUMENTS

| | | | |
|---|---|---|---|
| DE | 102018105293 | 9/2018 | |
| DE | 102018105293 A1 * | 9/2018 | ............ H04W 4/027 |

OTHER PUBLICATIONS

Agrawal et al., "Learning to See by Moving", International Conference on Computer Vision, Dec. 11, 2015-Dec. 18, 2015, Santiago, Chile, pp. 37-45.

(Continued)

*Primary Examiner* — Joan T Goodbody
(74) *Attorney, Agent, or Firm* — Dority & Manning, P.A.

(57) ABSTRACT

Systems and methods for improved vehicle-to-vehicle communications are provided. A system can obtain sensor data depicting its surrounding environment and input the sensor data (or processed sensor data) to a machine-learned model to perceive its surrounding environment based on its location within the environment. The machine-learned model can generate an intermediate environmental representation that encodes features within the surrounding environment. The system can receive a number of different intermediate environmental representations and corresponding locations from various other systems, aggregate the representations based on the corresponding locations, and perceive its surrounding environment based on the aggregated representations. The system can determine relative poses between the each of the systems and an absolute pose for each system based on the representations. Each representation can be aggregated based on the relative or absolute poses of each system and weighted according to an estimated accuracy of the location corresponding to the representation.

20 Claims, 9 Drawing Sheets

Related U.S. Application Data

(60) Provisional application No. 63/132,792, filed on Dec. 31, 2020, provisional application No. 63/058,040, filed on Jul. 29, 2020.

(51) Int. Cl.

| | |
|---|---|
| ***G05D 1/00*** | (2006.01) |
| ***G05D 1/246*** | (2024.01) |
| ***G05D 1/81*** | (2024.01) |
| ***G06F 18/2415*** | (2023.01) |
| ***G06N 20/00*** | (2019.01) |
| ***G06V 20/56*** | (2022.01) |
| *G06N 3/045* | (2023.01) |
| *G06N 3/09* | (2023.01) |

(52) U.S. Cl.
CPC ......... *G05D 1/0088* (2013.01); *G05D 1/0274* (2013.01); *G05D 1/246* (2024.01); *G05D 1/81* (2024.01); *G06F 18/2415* (2023.01); *G06N 20/00* (2019.01); *G06V 20/56* (2022.01); *G06N 3/045* (2023.01); *G06N 3/09* (2023.01)

(58) Field of Classification Search
CPC .... G06F 18/2415; G06N 20/00; G06N 3/045; G06N 3/09; G06V 20/56
See application file for complete search history.

(56) References Cited

U.S. PATENT DOCUMENTS

| | | | | |
|---|---|---|---|---|
| 2019/0095716 | A1* | 3/2019 | Shrestha | G06N 20/20 |
| 2019/0171871 | A1* | 6/2019 | Zhang | G06V 10/82 |
| 2019/0362157 | A1 | 11/2019 | Cambias | |
| 2020/0217972 | A1* | 7/2020 | Kim | G01C 21/3602 |

OTHER PUBLICATIONS

Arrigoni et al., "Robust synchronization in SO(3) and SE(3) via low-rank and sparse matrix decomposition", Computer Vision and Image Understanding, vol. 174, 2018, pp. 95-113.
Arrigoni et al., "Spectral Synchronization of Multiple Views in SE(3)", SIAM Journal of Imaging Sciences, vol. 9, No. 4, Nov. 2016, pp. 1963-1990.
Balachandar et al., "Collaboration of AI Agents via Cooperative Multi-Agent Deep Reinforcement Learning", arXiv:1907.00327v1, Jun. 30, 2019, 9 pages.
Bernard et al., "A Solution for Multi-Alignment by Transformation Synchronisation", IEEE Conference on Computer Vision and Pattern Recognition (CVPR), Jun. 7-12, 2015, Boston, MA, pp. 2161-2169.
Besag, "On the Statistical Analysis of Dirty Pictures", Journal of the Royal Statistical Society. Series B (Methodological), vol. 48, No. 3, 1986, pp. 259-279.
Birdal et al., "Bayesian Pose Graph Optimization via Bingham Distributions and Tempered Geodesic MCMC", Conference on Neural Information Processing Systems, Dec. 3-8, 2018, Montreal, Canada, 12 pages.
Chen et al., "Cooper: Cooperative Perception for Connected Autonomous Vehicles based on 3D Point Clouds", International Conference on Distributed Computing Systems, Jul. 7-10, 2019, Dallas, TX, pp. 514-524.
Choi et al., "A Large Dataset of Object Scans", arXiv:1602.02481v3, May 5, 2016, 7 pages.
Dornhege et al., "Visual Odometry for Tracked Vehicles", 2008 IEEE International Workshop on Safety, Security & Rescue Robotics (SSRR), Oct. 21-24, 2008, Sendai, Japan, 6 pages.
Fitzgibbon, "Robust registration of 2D and 3D point sets", Image and Vision Computing, vol. 21, 2003, pp. 1145-1153.
Gojcic et al., "Learning Multiview 3D point cloud registration", Conference on Computer Vision and Pattern Recognition, Jun. 14-19, 2020, Virtual, pp. 1759-1769.
Huang et al., "Learning Transformation Synchronization", Conference on Computer Vision and Pattern Recognition, Jun. 16-20, 2019, Long Beach, CA, pp. 8082-8091.
Kaess et al., "Flow Separation for Fast and Robust Stereo Odometry", IEEE International Conference on Robotics and Automation, May 12-17, 2009, Kobe, Japan, pp. 3539-3544.
Kingma et al., "Adam: A Method for Stochastic Optimization", arXiv:1412.6980v9, Jan. 30, 2017, 15 pages.
Li et al., "Gated Graph Sequence Neural Networks", arXiv:1511.05493v4, Sep. 22, 2017, 20 pages.
Liang et al., "Deep Continuous Fusion for Multi-Sensor 3D Object Detection", European Conference on Computer Vision, Sep. 8-14, 2018, Munich, Germany, 16 pages.
Liu et al., "ML Estimation of the t Distribution Using EM and its Extensions, ECM and ECME", Statistica Sinica, vol. 5, 1995, pp. 19-39.
Lu et al., "DeepICP: An End-to-End Deep Neural Network for 3D Point Cloud Registration", arXiv:1905.04153v2, Sep. 16, 2019, 10 pages.
Luo et al., "Efficient Deep Learning for Stereo Matching", Conference on Computer Vision and Pattern Recognition, Jun. 26-Jul. 1, 2016, Las Vegas, NV, pp. 5695-5703.
Manivasagam et al., "LiDARsim: Realistic LiDAR Simulation by Leveraging the Real World", Conference on Computer Vision and Pattern Recognition, Jun. 14-19, 2020, Virtual, pp. 11167-11176.
Matthies et al., "Error Modeling in Stereo Navigation", Autonomous Robot Vehicles, Springer, 1990, 12 pages.
Mohanty et al., "DeepVO: A Deep Learning approach for Monocular Visual Odometry", arXiv:1611.06069v1, Nov. 18, 2016, 9 pages.
Obst et al., "Multi-Sensor Data Fusion for Checking Plausibility of V2V Communications by Vision-based Multiple-Object Tracking" IEEE Vehicular Networking Conference, Dec. 3-5, 2014, Paderborn, Germany, pp. 143-150.
Omidshafiei et al., "Deep Decentralized Multi-task Multi-Agent Reinforcement Learning under Partial Observability", International Conference on Machine Learning, Aug. 6-11, 2017, Sydney, Australia, 10 pages.
Pomerleau et al., "A Review of Point Cloud Registration Algorithms for Mobile Robotics", Foundations and Trends in Robotics, vol. 4, No. 1, 2013, 107 pages.
Purkait et al., "NeuRoRA: Neural Robust Rotation Averaging", arXiv:1912.04485v1, Dec. 10, 2019, 10 pages.
Rauch et al., "Car2X-Based Perception in a High-Level Fusion Architecture for Cooperative Perception Systems", Intelligent Vehicles Symposium, Jun. 3-7, 2012, Alcala de Henares, Spain, pp. 270-275.
Rawashdeh et al., "Collaborative Automated Driving: A Machine Learning-Based Method to Enhance the Accuracy of Shared Information", International Conference on Intelligent Transportation Systems (ITSC), Nov. 4-7, 2018, Maui, Hawaii, pp. 3961-3966.
Rockl et al., "V2V Communications in Automotive Multi-sensor Multi-target Tracking", 68th Vehicular Technology Conference, Sep. 21-24, 2008, Calgary, Canada, 5 pages.
Rosen et al., "A Certifiably Correct Algorithm for Synchronization over the Special Euclidean Group", arXiv:1611.00128v3, Feb. 10, 2017, 16 pages.
Singer, "Angular synchronization by eigenvectors and semidefinite programming", Applied and Computational Harmonic Analysis, vol. 30, 2011, pp. 20-36.
Smith et al., "Super-Convergence: Very Fast Training of Neural Networks Using Large Learning Rates", arXiv:1708.07120v3, May 17, 2018, 18 pages.
Sukhbaatar et al., "Learning Multiagent Communication with Backpropagation", Conference on Neural Information Processing Systems, Dec. 5-10, 2016, Barcelona, Spain, 9 pages.
Talukder et al., "Real-time detection of moving objects in a dynamic scene from moving robotic vehicles", International Conference on Intelligent Robots and Systems, Oct. 27-Nov. 1, 2003, Las Vegas, NV, pp. 1308-1313.
Wang et al., "Deep VO: Towards End-to-End Visual Odometry with Deep Recurrent Convolutional Neural Networks", IEEE Interna-

(56) References Cited

OTHER PUBLICATIONS tional Conference on Robotics and Automation (ICRA), May 29-Jun. 3, 2017, Singapore, pp. 2043-2050.
Wang et al., "Robust Probabilistic Modeling with Bayesian Data Reweighting", International Conference on Machine Learning, Aug. 6-11, 2017, Sydney, Australia, 10 pages.
Wang et al., "V2VNet: Vehicle-to-Vehicle Communication for Joint Perception and Prediction", European Conference on Computer Vision, Aug. 23-28, 2020, Virtual, 17 pages.
Yang et al., "A Polynomial-time Solution for Robust Registration with Extreme Outlier Rates", Robotics: Science and Systems, Jun. 22-26, 2016, Freiburg im Breisgau, Germany, 10 pages.
Yew et al., "3DFeat-Net: Weakly Supervised Local 3D Features for Point Cloud Registration", European Conference on Computer Vision, Sep. 8-14, 2018, Munich, Germany, 17 pages.
Yousif et al., "An Overview to Visual Odometry and Visual Slam: Applications to Mobile Robotics", Intelligent Industrial Systems, vol. 1, No. 4, 2015, pp. 289-311.

* cited by examiner

FIG. 4

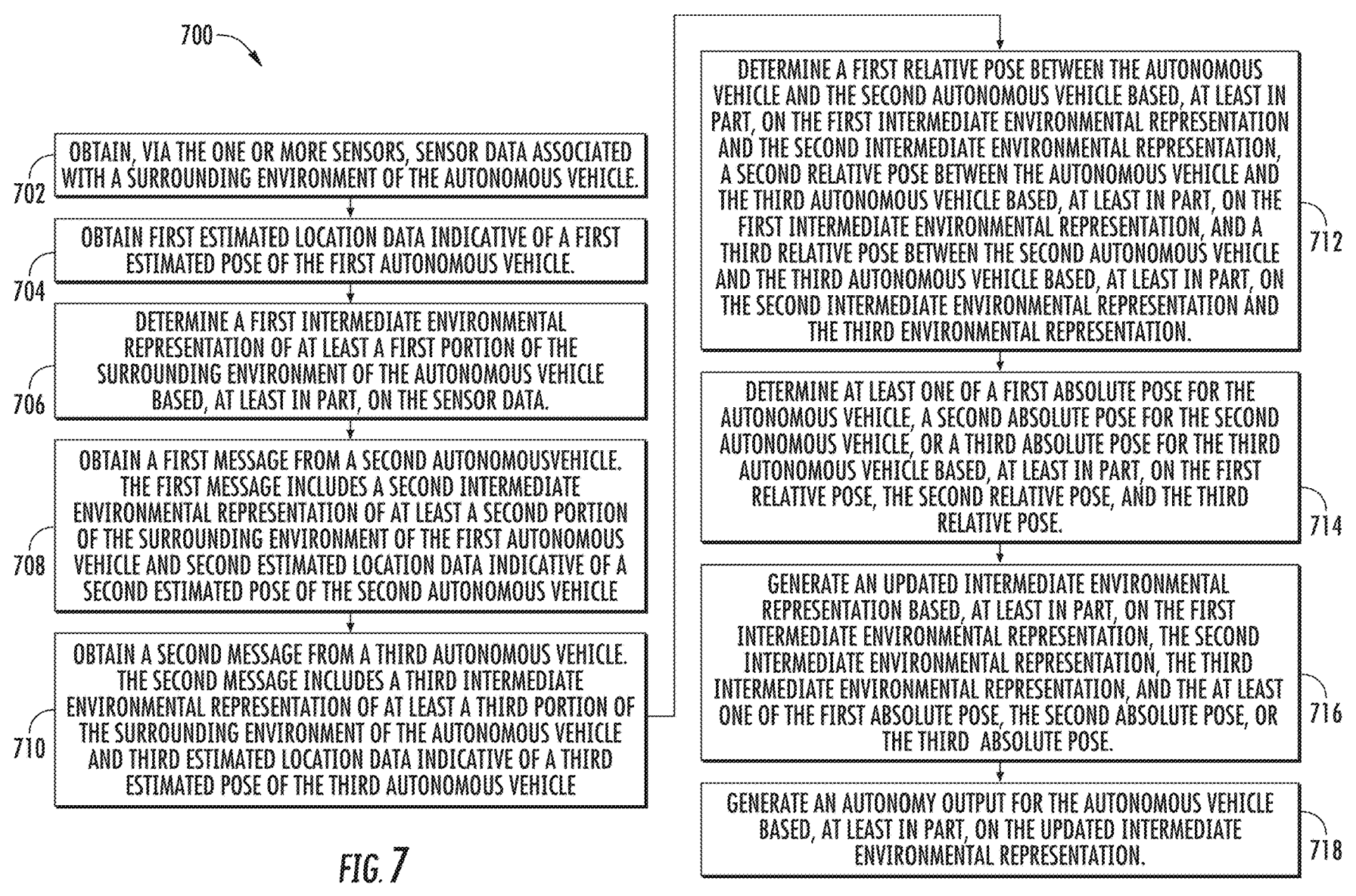

700

702 OBTAIN, VIA THE ONE OR MORE SENSORS, SENSOR DATA ASSOCIATED WITH A SURROUNDING ENVIRONMENT OF THE AUTONOMOUS VEHICLE.

704 OBTAIN FIRST ESTIMATED LOCATION DATA INDICATIVE OF A FIRST ESTIMATED POSE OF THE FIRST AUTONOMOUS VEHICLE.

706 DETERMINE A FIRST INTERMEDIATE ENVIRONMENTAL REPRESENTATION OF AT LEAST A FIRST PORTION OF THE SURROUNDING ENVIRONMENT OF THE AUTONOMOUS VEHICLE BASED, AT LEAST IN PART, ON THE SENSOR DATA.

708 OBTAIN A FIRST MESSAGE FROM A SECOND AUTONOMOUSVEHICLE. THE FIRST MESSAGE INCLUDES A SECOND INTERMEDIATE ENVIRONMENTAL REPRESENTATION OF AT LEAST A SECOND PORTION OF THE SURROUNDING ENVIRONMENT OF THE FIRST AUTONOMOUS VEHICLE AND SECOND ESTIMATED LOCATION DATA INDICATIVE OF A SECOND ESTIMATED POSE OF THE SECOND AUTONOMOUS VEHICLE

710 OBTAIN A SECOND MESSAGE FROM A THIRD AUTONOMOUS VEHICLE. THE SECOND MESSAGE INCLUDES A THIRD INTERMEDIATE ENVIRONMENTAL REPRESENTATION OF AT LEAST A THIRD PORTION OF THE SURROUNDING ENVIRONMENT OF THE AUTONOMOUS VEHICLE AND THIRD ESTIMATED LOCATION DATA INDICATIVE OF A THIRD ESTIMATED POSE OF THE THIRD AUTONOMOUS VEHICLE

712 DETERMINE A FIRST RELATIVE POSE BETWEEN THE AUTONOMOUS VEHICLE AND THE SECOND AUTONOMOUS VEHICLE BASED, AT LEAST IN PART, ON THE FIRST INTERMEDIATE ENVIRONMENTAL REPRESENTATION AND THE SECOND INTERMEDIATE ENVIRONMENTAL REPRESENTATION, A SECOND RELATIVE POSE BETWEEN THE AUTONOMOUS VEHICLE AND THE THIRD AUTONOMOUS VEHICLE BASED, AT LEAST IN PART, ON THE FIRST INTERMEDIATE ENVIRONMENTAL REPRESENTATION, AND A THIRD RELATIVE POSE BETWEEN THE SECOND AUTONOMOUS VEHICLE AND THE THIRD AUTONOMOUS VEHICLE BASED, AT LEAST IN PART, ON THE SECOND INTERMEDIATE ENVIRONMENTAL REPRESENTATION AND THE THIRD ENVIRONMENTAL REPRESENTATION.

714 DETERMINE AT LEAST ONE OF A FIRST ABSOLUTE POSE FOR THE AUTONOMOUS VEHICLE, A SECOND ABSOLUTE POSE FOR THE SECOND AUTONOMOUS VEHICLE, OR A THIRD ABSOLUTE POSE FOR THE THIRD AUTONOMOUS VEHICLE BASED, AT LEAST IN PART, ON THE FIRST RELATIVE POSE, THE SECOND RELATIVE POSE, AND THE THIRD RELATIVE POSE.

716 GENERATE AN UPDATED INTERMEDIATE ENVIRONMENTAL REPRESENTATION BASED, AT LEAST IN PART, ON THE FIRST INTERMEDIATE ENVIRONMENTAL REPRESENTATION, THE SECOND INTERMEDIATE ENVIRONMENTAL REPRESENTATION, THE THIRD INTERMEDIATE ENVIRONMENTAL REPRESENTATION, AND THE AT LEAST ONE OF THE FIRST ABSOLUTE POSE, THE SECOND ABSOLUTE POSE, OR THE THIRD ABSOLUTE POSE.

718 GENERATE AN AUTONOMY OUTPUT FOR THE AUTONOMOUS VEHICLE BASED, AT LEAST IN PART, ON THE UPDATED INTERMEDIATE ENVIRONMENTAL REPRESENTATION.

FIG. 7

SYSTEMS AND METHODS FOR MITIGATING VEHICLE POSE ERROR ACROSS AN AGGREGATED FEATURE MAP

RELATED APPLICATIONS

The present application is a continuation of U.S. Non-Provisional patent application Ser. No. 17/150,998 (filed Jan. 15, 2021), which is hereby incorporated by reference herein in its entirety.

U.S. Non-Provisional patent application Ser. No. 17/150,998 claims priority to U.S. Provisional Patent Application No. 63/132,792 (filed Dec. 31, 2020), which is hereby incorporated by reference herein in its entirety.

U.S. Non-Provisional patent application Ser. No. 17/150,998 claims priority to U.S. Provisional Patent Application No. 63/058,040 (filed Jul. 29, 2020), which is hereby incorporated by reference herein in its entirety.

FIELD

The present disclosure relates generally to performing autonomous vehicle operations. In particular, the present disclosure relates to mitigating vehicle pose errors across an aggregated feature map used for performing autonomous vehicle operations.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by a computing system including one or more computing devices onboard an autonomous vehicle, sensor data associated with an environment of a first autonomous vehicle. The method includes obtaining, by the computing system, estimated location data indicative of a first estimated pose of the first autonomous vehicle. The method includes determining, by the computing system, a first intermediate environmental representation of at least a first portion of the environment of the first autonomous vehicle based, at least in part, on the sensor data. The method includes obtaining, by the computing system, a first message from a second autonomous vehicle. The first message can include a second intermediate environmental representation of at least a second portion of the environment of the first autonomous vehicle and second estimated location data indicative of a second estimated pose of the second autonomous vehicle. The method can include determining, by the computing system, a first relative pose between the first autonomous vehicle and the second autonomous vehicle based, at least in part, on the intermediate environmental representation and the second intermediate environmental representation. The method can include generating, by the computing system, an updated intermediate environmental representation based, at least in part, on the first intermediate environmental representation, the second intermediate environmental representation, and the first relative pose. And, the method can include generating, by the computing system, an autonomy output for the first autonomous vehicle based, at least in part, on the updated intermediate environmental representation.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining sensor data associated with an environment of a first autonomous vehicle. The operations include obtaining estimated location data indicative of a first estimated pose of the first autonomous vehicle. The operations include determining, via a first portion of a machine-learned detection and prediction model, a first intermediate environmental representation of at least a first portion of the environment of the first autonomous vehicle based, at least in part, on the sensor data. The operations include obtaining a first message from a second autonomous vehicle. The first message includes a second intermediate environmental representation of at least a second portion of the environment of the first autonomous vehicle and second estimated location data indicative of a second estimated pose of the second autonomous vehicle. The operations include determining, via a machine-learned regression model, a first relative pose between the first autonomous vehicle and the second autonomous vehicle based, at least in part, on the intermediate environmental representation and the second intermediate environmental representation. And, the operations include generating, via a second portion of the machine-learned detection and prediction model, an autonomy output for the first autonomous vehicle based, at least in part, on the first intermediate environmental representation, the second intermediate environmental representation, and the first relative pose.

Another example aspect of the present disclosure is directed to an autonomous vehicle. The autonomous vehicle includes one or more sensors, one or more processors, and one or more tangible, non-transitory, computer readable media that collectively store instructions that when executed by the one or more processors cause the one or more processors to perform operations. The operations include obtaining, via the one or more sensors, sensor data associated with a surrounding environment of the autonomous vehicle. The operations include determining a first intermediate environmental representation of at least a first portion of the surrounding environment of the autonomous vehicle based, at least in part, on the sensor data. The operations include obtaining a plurality of messages from a plurality of respective autonomous vehicles. Each respective message of the plurality of messages includes a respective intermediate environmental representation of at least another portion of the surrounding environment associated with a respective autonomous vehicle of the plurality of respective autonomous vehicles. The operations include determining a plurality of relative poses based, at least in part, on the first intermediate environmental representation and the respective intermediate environmental representation. The plurality of relative poses include a respective relative pose between the autonomous vehicle and each of the plurality of respective autonomous vehicles. The operations include determining a plurality of absolute poses based, at least in part, on the plurality of relative poses. The plurality of absolute poses include a respective absolute pose for the autonomous vehicle and each of the plurality of respective autonomous vehicles. The operations include generating an updated intermediate environmental representation based, at least in part, on the first intermediate environmental representation, the respective intermediate environmental representation, and at least one of the plurality of absolute poses. The operations include generating an autonomy output for the autonomous vehicle based, at least in part, on the updated intermediate environmental representation.

Other example aspects of the present disclosure are directed to systems, methods, vehicles, apparatuses, tangible, non-transitory computer-readable media, and memory devices for operating autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 depicts a visualization of an example intermediate environmental representation according to example embodiments of the present disclosure.

FIG. 7 depicts a flow diagram of a method for correcting pose errors according to example embodiments of the present disclosure.

DETAILED DESCRIPTION

Figure 1:
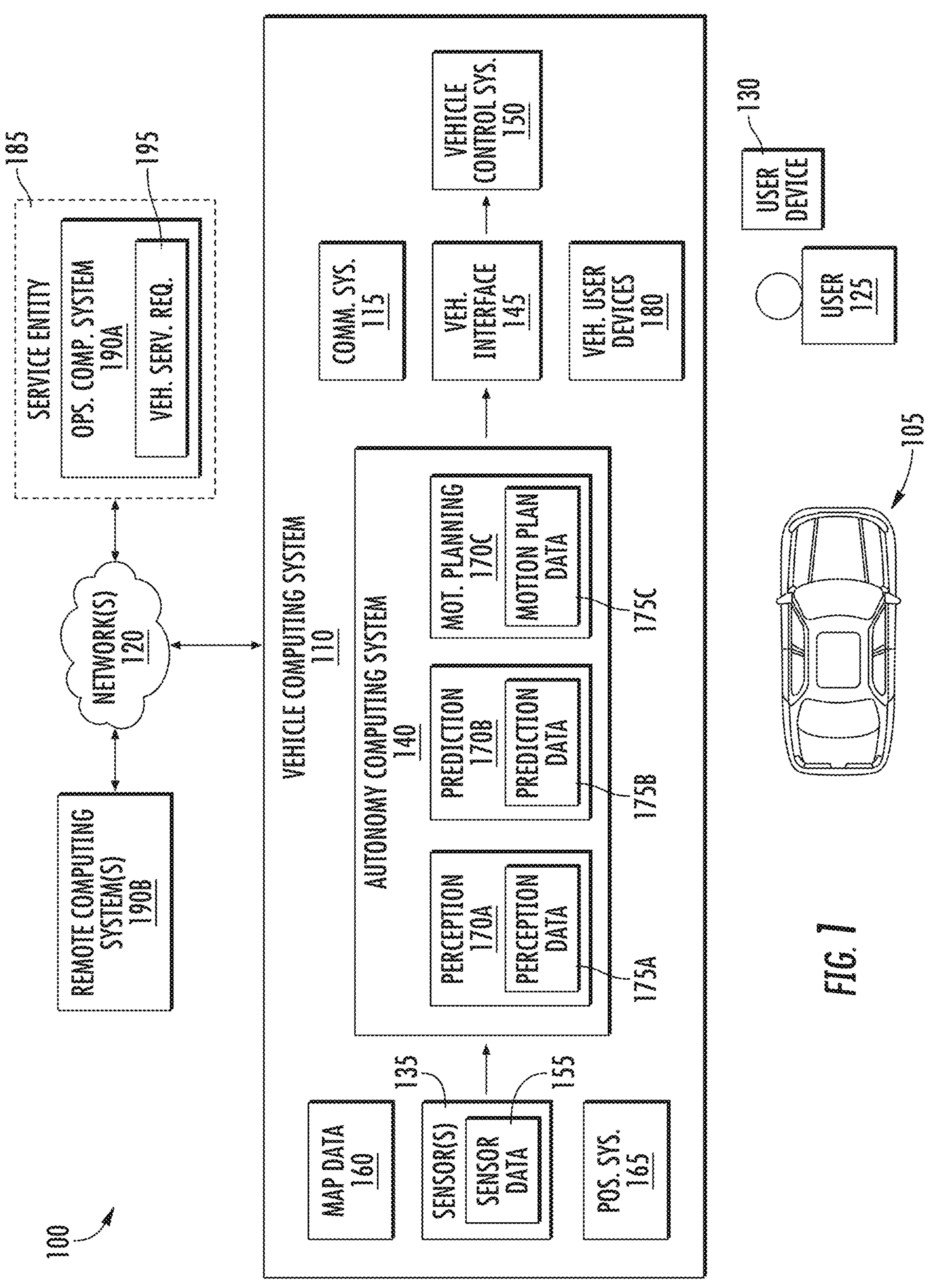
FIG. 1 depicts a block diagram of an example system for an autonomous vehicle according to example embodiments of the present disclosure.

Aspects of the present disclosure are directed to improved systems and methods for detecting and compensating for pose errors associated with information received during communications among autonomous vehicles and/or other systems. More particularly, communication technology of the present disclosure allows autonomous vehicles and/or other systems to share intermediate feature representations and intelligently aggregate this information to improve autonomous vehicle/system operations. For instance, a transmitter autonomous vehicle can obtain sensor data (e.g., Light Detection and Ranging (LIDAR) data, etc.) indicative of the vehicle's surrounding environment. The transmitter autonomous vehicle can generate an intermediate environmental representation (e.g., an encoded feature map, etc.) based, at least in part, on the sensor data (e.g., voxelized LIDAR data). A recipient autonomous vehicle can receive the intermediate environmental representation and utilize the intermediate environmental representation to improve its autonomous operations. For instance, the recipient autonomous vehicle can utilize a machine-learned aggregation model to generate an updated intermediate environmental representation based, at least in part, on the intermediate environmental representation. The updated intermediate environmental representation can pool information detected by sensors of both the transmitter and recipient vehicles. In this way, the updated intermediate environmental representation can be input into a machine-learned model (e.g., a joint machine-learned detection and prediction model) at the recipient autonomous vehicle to identify objects detected by the transmitter, recipient, or both vehicles. This can lead to more accurate estimates of an object's position, size, and shape, as well as the predicted future trajectory of the object and improve the ability of the recipient autonomous vehicle to safely plan its motion though its environment. These advantages can rely on current pose estimates of the associated vehicle.

Aspects of the present disclosure are directed to improved systems and methods for training machine-learned models to detect and mitigate pose errors associated with intermediate environmental representations received via communications between autonomous vehicles and other systems (e.g., other vehicles, etc.). More particularly, an autonomous vehicle can generate an intermediate environmental representation (e.g., a feature map) representative of a portion of its surrounding environment based, at least in part, on sensor data associated with the environment. The autonomous vehicle can receive additional intermediate environmental representations of the environment from other associated vehicles. Each intermediate environmental representation can be associated with an estimated pose (e.g., spatial coordinates/orientation) determined by a respective autonomous vehicle. The autonomous vehicle can determine a relative pose between each of the autonomous vehicles and determine an absolute pose (e.g., updated spatial coordinates/orientation) for each vehicle based, at least in part, on the relative poses. The autonomous vehicle can generate an updated intermediate environmental representation by aggregating the information provided by one or more of the intermediate environmental representations based, at least in part, on the determined absolute poses. An autonomy output can be generated based, at least in part, on the updated intermediate environmental representation. In this way, machine-learned models can be trained to identify, and correct pose errors provided by associated autonomous vehicles. This, in turn, provides an improvement to computing technology by increasing the accuracy of information derived from autonomous vehicle communications, thereby increasing the speed, efficiency, and reliability of estimating an object's position, size, and shape using knowledge provided by third-parties (e.g., other vehicles, etc.).

The following describes the technology of this disclosure within the context of autonomous vehicles for example purposes only. As described herein, the technology is not limited to an autonomous vehicle setting and can be implemented within other robotic and/or computing systems, such as those utilizing object detection and/or prediction machine-learned models. Moreover, the technology of this disclosure can be described, at times, within the context of vehicle-to-vehicle communications for example purposes only. The technology can be utilized by a variety of types of computing systems that may communicate with other computing systems of the same or different type. By way of example, a ground-based autonomous vehicle, aerial-based autonomous vehicle, or any other robotic system can utilize the technology described herein for communicating with another type of vehicle (e.g., ground vehicle, aerial vehicle, etc.) and/or an infrastructure element (e.g., a stationary sensor suite on a building, traffic light, etc.).

An autonomous vehicle can include an onboard vehicle computing system with a variety of components for operating with minimal and/or no interaction from a human operator. For example, the computing system can be located onboard the autonomous vehicle and include one or more sensors (e.g., cameras, LIDAR, Radio Detection and Ranging (RADAR), etc.), an autonomy computing system (e.g., for determining autonomous navigation), one or more vehicle control systems (e.g., for controlling braking, steering, powertrain), etc.

The vehicle computing system (e.g., the autonomy computing system) can include sub-systems that cooperate to perceive the surrounding environment of the autonomous vehicle and determine a motion plan for controlling the motion of the autonomous vehicle. For example, the vehicle computing system can include a joint perception and prediction system configured to perceive object(s) within the surrounding environment of the autonomous vehicle and to predict motion of the object(s) within the surrounding environment of the autonomous vehicle. In some implementations, the vehicle computing system can separate these perception and prediction functions into separate systems. The vehicle computing system can include a motion planning system configured to plan the motion of the autonomous vehicle with respect to the object(s) within the surrounding environment of the autonomous vehicle.

Autonomous vehicles can operate within geographic areas or have operating domains that can include other autonomous vehicles. For example, a plurality of autonomous vehicles can be located within a geographic area. The geographic area can include one or more travel ways (e.g., roadways, etc.) and one or more geographic features (e.g., cross walks, lane boundaries, etc.). In some implementations, the geographic area can include infrastructure elements that include computing systems with communication technology capable of communicating with one or more of the autonomous vehicles within the geographic area, as further described herein. The geographic area can also include one or more objects. The objects can include, for example, static object(s) (e.g., lampposts, parking meters, etc.) and/or dynamic actor objects (e.g., pedestrians, vehicles, bicycles/bicyclists, etc.) that are and/or may be in motion.

Each of the plurality of autonomous vehicles can include a communication system that allows the respective vehicle's computing system to communicate with system(s) that are remote from the autonomous vehicle. For example, an autonomous vehicle can utilize its communication system to send and receive messages (e.g., via an internet connection) from a cloud-based server system that helps support the autonomous vehicle. This can include, for example, an offboard service assignment system and routing system that matches the autonomous vehicle to a request for a vehicle service (e.g., rideshare service) and provides the autonomous vehicle with a route for completing the vehicle service. Each autonomous vehicle can also have a communication range that allows the autonomous vehicle to communicate with computing systems nearby the autonomous vehicle. For example, a first autonomous vehicle can have a first communication range that is based at least in part on the vehicle's communication hardware (e.g., antenna, etc.) and the communication protocol utilized by the first autonomous vehicle. The first communication range can be represented by a radial distance from the first autonomous vehicle. The first autonomous vehicle can communicate to an ecosystem of autonomous vehicles within the first communication range. For example, the first autonomous vehicle (a "recipient autonomous vehicle") can receive data from a second, different autonomous vehicle ("a first transmitter autonomous vehicle") that is within the first communication range of the first autonomous vehicle. The first autonomous vehicle can receive data from any number of autonomous vehicles (e.g., a third autonomous vehicle (e.g., "a second transmitter vehicle")) within the first communication range of the first autonomous vehicle. The systems and methods of the present disclosure can allow the ecosystem of autonomous vehicles to provide inter-vehicle communications that improve the vehicles' autonomous operations while reducing the communication bandwidth and potential information loss associated with doing so.

A transmitter (e.g., a first, second, third, etc.) autonomous vehicle (e.g., its onboard vehicle computing system) can obtain sensor data associated with an environment (e.g., a portion of a surrounding environment of another, recipient autonomous vehicle) of the transmitter autonomous vehicle. The sensor data can include one or more types of sensor data associated with one or more sensor modalities. For example, the sensor data can include three-dimensional data representative of the surrounding environment of the transmitter autonomous vehicle. For instance, the sensor data can include three-dimensional point cloud data (e.g., LIDAR point cloud data). In some implementations, the sensor data can include a fusion of different types of sensor data. For example, the sensor data can include a first type of sensor data (e.g., camera image data) associated with a first sensor modality (e.g., stereo camera) and a second type of sensor data (e.g., LIDAR data) associated with a second sensor modality (e.g., LIDAR system). In some implementations, the sensor data can include data acquired by multiple different autonomous vehicles. For example, the sensor data can include a first set of sensor data (e.g., a first set of LIDAR data) acquired by the transmitter autonomous vehicle and a second set of sensor data (e.g., a second set of LIDAR data) that was acquired by another autonomous vehicle in its ecosystem and sent to the transmitter autonomous vehicle.

In addition, or alternatively, the transmitter autonomous vehicle can obtain estimated location data indicative of an estimated pose of the transmitter autonomous vehicle. The estimated pose, for example, can be indicative of one or more estimated spatial coordinates and an estimated orientation of the transmitter autonomous vehicle. By way of example, the autonomous vehicle can include one or more location measurement sensors such as, for example, one or more global positioning systems (e.g., GPSs), inertial measurement units (e.g., IMUs), and/or any other sensors configured to determine a current location and/or orientation of the autonomous vehicle. The autonomous vehicle can be configured to obtain the estimated location data from the one or more location measurement sensors.

The transmitter autonomous vehicle can generate an intermediate representation for use by another autonomous vehicle (e.g., a recipient autonomous vehicle). The intermediate representation can be generated based, at least in part, on the sensor data and can be descriptive of at least a portion of an environment of the other autonomous vehicle. As one example, a transmitter autonomous vehicle can determine an intermediate representation of at least a portion of the surrounding environment of the transmitter autonomous vehicle based at least in part on the sensor data. The intermediate representation can include a feature map indicative of at least a portion of the environment. To determine the intermediate environmental representation, the transmitter autonomous vehicle can generate voxelized sensor data by voxelizing the three-dimensional point cloud data of the sensor data. By way of example, the transmitter autonomous vehicle can extract raw features from its LIDAR sensor data and transform them into a bird's eye view (BEV). The features can include, for example, a heading and/or shape of an object indicated in the intermediate environmental representation. The transmitter autonomous vehicle can voxelize the LIDAR point clouds (e.g., in 15 $cm^3$, etc.), apply several convolutional layers, and output feature maps of shape H×W×C, where H×W denotes the scene range in BEV, and C is the number of feature channels.

The intermediate environmental representation can be generated based, at least in part, on a machine-learned model (e.g., a joint detection and prediction model) associated with the recipient autonomous vehicle. The machine-learned model associated with the recipient autonomous vehicle can include a machine-learned model utilized by a recipient vehicle computing system of the recipient autonomous vehicle to perceive (e.g., identify) one or more objects within its surrounding environment and/or predict the motion of the one or more objects. The transmitter autonomous vehicle can generate the intermediate environmental representation, via a first portion of the machine-learned model (e.g., a convolutional neural network, etc.), based, at least in part, on the sensor data. The first portion, for example, can include one or more convolutional layers of the machine-learned model. For instance, the transmitter autonomous vehicle can input the voxelized sensor data into the machine-learned model. The machine-learned model can be configured to apply one or more convolutional layers to the voxelized sensor data. For example, the machine-learned model can utilize a plurality of layers (e.g., three layers, etc.) of 3×3 convolution filters (e.g., with strides of 2, 1, 2 respectively) to produce the intermediate representation. The intermediate environmental representation can be, for example, a 4× down sampled spatial feature map. The feature map can be represented as a matrix generated from the array(s) of the sensor data. The transmitter autonomous vehicle can receive the intermediate environmental representation (e.g., an activation of intermediate neural network layers, etc.) as an output of the first portion (e.g., one or more first (e.g., intermediate) neural network layers) of the machine-learned model.

The transmitter autonomous vehicle can select a recipient autonomous vehicle for which to communicate data indicative of the intermediate environmental representation from among a plurality of autonomous vehicles. In some implementations, the transmitter autonomous vehicle can select a recipient autonomous vehicle based at least in part on a communication range of the transmitter autonomous vehicle. For example, the transmitter autonomous vehicle can determine that it will communicate the data indicative of the intermediate environmental representations to one or more of the autonomous vehicles within its communication range. In some implementations, the transmitter autonomous vehicle can select a recipient autonomous vehicle based at least in part on data indicating that the recipient autonomous vehicle is capable of processing the intermediate environmental representations. For example, there can be a plurality of autonomous vehicles within the communication range of the transmitter autonomous vehicle. In some implementations, only a subset of those autonomous vehicles may be capable of processing the intermediate environmental representation. The transmitter autonomous vehicle may communicate with the other autonomous vehicles (e.g., when entering the vehicle's communication range, periodically, etc.) to determine which of the autonomous vehicles are able to utilize intermediate environmental representations. This can include, for example, an exchange of identifiers, information, and/or other data indicating that a respective autonomous vehicle is able to transmit, receive, and/or process compressed intermediate environmental representations in the manner described herein.

In this manner, a first (e.g., recipient) autonomous vehicle can obtain one or more intermediate environmental representations from one or more different autonomous vehicles. As described herein, the first autonomous vehicle can generate a first intermediate environmental representation based at least in part on sensor data indicative of its surrounding environment. The first autonomous vehicle can determine an updated intermediate environmental representation by aggregating the first intermediate environment representation with each of the one or more intermediate environmental representations. Each intermediate environmental representation can be aggregated based, at least in part, on an estimated pose of the transmitter autonomous vehicle associated with the representation. Inaccurate estimated poses of the transmitter autonomous vehicles can interfere with the accuracy of the updated intermediate environment representation. The systems and methods disclosed herein prevent inaccuracies with the updated intermediate environmental representations by detecting, correcting, and compensating for inaccurate pose estimates.

To do so, a first (e.g., recipient) autonomous vehicle can obtain (e.g., via one or more sensors of an onboard vehicle computing system) sensor data (e.g., the sensor data described above with reference to the transmitter autonomous vehicle(s) associated with an environment (e.g., a surrounding environment) of the first autonomous vehicle. In addition, or alternatively, the first autonomous vehicle can obtain estimated location data (e.g., in the manner described above with reference to the transmitter autonomous vehicle) indicative of a first estimated pose of the first autonomous vehicle. The first autonomous vehicle can determine a first intermediate environmental representation (e.g., in the manner described above with reference to the transmitter autonomous vehicle) of at least a first portion of the environment (e.g., surrounding environment) of the first autonomous vehicle based, at least in part, on the sensor data.

The first autonomous vehicle (and/or vehicle computing system thereof) can obtain one or more messages from one or more transmitter autonomous vehicle(s) within the environment of the first autonomous vehicle. Each message can include an intermediate environmental representation of at least a portion of the environment of the first autonomous vehicle (e.g., from the perspective of a respective transmitter autonomous vehicle) and/or estimated location data indicative of an estimated pose of a respective transmitter autonomous vehicle.

As an example, the first autonomous vehicle can obtain a first message from a second (e.g., a first transmitter) autonomous vehicle. The first message can include a second intermediate environmental representation of at least a second portion of the environment of the first autonomous vehicle and/or second estimated location data indicative of a second estimated pose of the second autonomous vehicle. In addition, or alternatively, the first autonomous vehicle can obtain a second message from a third autonomous vehicle. The second message can include a third intermediate environmental representation of at least a third portion of the environment of the first autonomous vehicle and/or third estimated location data indicative of a third estimated pose of the third autonomous vehicle.

For example, the first autonomous vehicle i can have a noisy estimate of its own pose (e.g., first estimated pose) denoted $\tilde{\xi}_i$, and can receive the noisy poses (e.g., second estimated pose, third estimated pose, etc.) of neighboring autonomous vehicles j (e.g., second autonomous vehicle, third autonomous vehicle, etc.) as part of the messages (e.g., first message, second message, etc.). These noisy poses (e.g., first, second, third estimated poses, etc.) can be used to compute noisy relative transformations between the first autonomous vehicle i and j denoted $\widetilde{\xi_{i,j}}$.

For example, the first autonomous vehicle can determine one or more relative poses between each of the associated autonomous vehicles. For example, the first autonomous vehicle can determine a first relative pose between the first autonomous vehicle and the second autonomous vehicle based, at least in part, on the intermediate environmental representation and the second intermediate environmental representation. As another example, the first autonomous vehicle can determine a second relative pose between the first autonomous vehicle and the third autonomous vehicle based, at least in part, on the first intermediate environmental representation and the third intermediate environmental representation. In some implementations, the first autonomous vehicle can determine a third relative pose between the second autonomous vehicle and the third autonomous vehicle based, at least in part, on the second intermediate environmental representation and the third intermediate environmental representation.

Each relative pose can identify a displacement between one or more autonomous vehicles. For example, the first relative pose can be indicative of a first displacement between the first autonomous vehicle and the second autonomous vehicle. The second relative pose can be indicative of a second displacement between the first autonomous vehicle and the third autonomous vehicle. The third relative pose can be indicative of a third displacement between the second autonomous vehicle and the third autonomous vehicle.

Each relative pose can be determined based, at least in part, on a pair of intermediate environmental representations and/or a machine-learned regression model. For example, the first intermediate environmental representation can include a first feature map encoded with a first plurality of encoded features representative of the first portion of the environment. The second intermediate environmental representation can include a second feature map encoded with a second plurality of encoded features representative of the second portion of the environment. The third intermediate environmental representation can include a third feature map encoded with a third plurality of encoded features representative of the third portion of the environment.

Each relative pose can be determined by inputting data indicative of a pair of intermediate environmental representations into the machine-learned regression model. For example, the first autonomous vehicle can determine, via the machine-learned regression model, the first relative pose between the first autonomous vehicle and the second autonomous vehicle. To do so, the first autonomous vehicle can generate an intermediate environmental representation pair by concatenating the first plurality of encoded features and the second plurality of encoded features along a features dimension. The first autonomous vehicle can input the intermediate environmental representation pair to the machine-learned regression model to obtain the first relative pose. For example, the machine-learned regressing model can be configured to output the relative pose based, at least in part, on the intermediate environmental representation pair.

By way of example, since each of autonomous vehicle perceives different views (e.g., based, at least in part, on the position and/or orientation of the vehicle) of the same scene, a convolutional neural network (e.g., machine-learned regression model) can be used to learn the discrepancy between what a vehicle sees and the orientation of the warped incoming messages. The machine-learned regression model for the ith autonomous vehicle can take $(m_i \| m_{ji})$ as input and outputs a correction $\widehat{c_{ji}}$ such that $\widehat{c_{ji}} \circ \widetilde{\xi_{ji}} = \widetilde{\xi_{ji}}$. $\|$ can denote the concatenation along the features dimension and $\widehat{c_{ji}} \circ \widetilde{\xi_{ji}}$ can represent applying the transformation $\widehat{c_{ji}}$ to the noisy transformation $\widetilde{\xi_{ji}}$. An independent prediction (e.g., relative pose) can be determined for each directed edge such that $\widetilde{\xi_{ji}} \neq \widetilde{\xi_{ij}}^{-1}$.

The first autonomous vehicle can determine one or more absolute poses for one or more of the received intermediate environmental representations. Each absolute pose, for example, can include updated spatial coordinates and/or orientations for each of the transmitter autonomous vehicles. For example, the first autonomous vehicle can determine a first absolute pose indicative of one or more first updated spatial coordinates and/or a first updated orientation for the first autonomous vehicle. In addition, or alternatively, the first autonomous vehicle can determine a second absolute pose indicative of one or more second updated spatial coordinates and/or a second updated orientation for the second autonomous vehicle. In addition, in some implementations, the first autonomous vehicle can determine a third absolute pose indicative of one or more third updated spatial coordinates and/or a third updated orientation for the third autonomous vehicle.

The first autonomous vehicle can determine the first, second, and/or third absolute pose based, at least in part, on the first, second, and/or third relative poses. For example, the relative pose estimates can be refined from the machine-learned regressions model by finding a set of globally consistent absolute poses among the autonomous vehicle (e.g., first, second, third, etc. autonomous vehicles). By allowing the autonomous vehicles to reach a global consensus about each other's absolute pose, the first autonomous vehicle can mitigate pose error. The absolute poses can be determined using a Markov random field, where each absolute pose is a node conditioned on the estimated relative poses. The distribution of poses can be conditioned on these can have a heavy tail due to outliers. Each absolute pose $\xi_i$ can follow a multivariate student t-distribution with mean $\xi_i \in \mathbb{R}^3$ and scale $\Sigma_i \in \mathbb{R}^{3\times3}$ given the relative poses.

The pairwise potential can include likelihoods, weights, and/or weight priors defined below. Unary potentials may not be used.

$$\psi(i, j) = \underbrace{p\left(\hat{\xi}_{ji} \circ \xi_j\right)^{w_{ji}} p\left(\hat{\xi}_{ji}^{-1} \circ \xi_j\right)^{w_{ji}}}_{\textit{Weighted Likelihood given } \hat{\xi}_{ji}} \underbrace{p\left(\hat{\xi}_{ij} \circ \xi_i\right)^{w_{ij}} p\left(\hat{\xi}_{ij}^{-1} \circ \xi_j\right)^{w_{ij}}}_{\textit{Weighted Likelihood given } \hat{\xi}_{ij}} \underbrace{p(w_{ji})p(w_{ij})}_{\textit{Weight Priors}}.$$

The likelihood terms $p(\hat{\xi}_{ji} \circ \xi_j)$ and $$p\left(\hat{\xi}_{ji}^{-1} \circ \xi_j\right),$$

both t-distributed centered at $\xi_i$ can encourage the result of the relative transformation from transmitter vehicles (e.g., second, third, etc. autonomous vehicles) to stay close to a recipient vehicle (e.g., first autonomous vehicle). Both directions are included due to symmetry of the rigid transformations. In some implementations, not all pairwise transformations can provide the same amount of information. Since the machine-learned regression module can produce heavy tailed errors, the edge potentials can down weight erroneous pose regression outputs. For example, a weight $w_{ji}$ scalar for each term in the pairwise potential:

$$p\left(\hat{\xi}_{ji} \circ \xi_j\right)^{w_{ji}},$$

so that zero weighted terms can be ignored. The prior distribution for each $w_{ji}$ can be used, where the mean of the distribution $o_{ji}$—the fraction of spatial overlap between two messages. In some implementations, the absolute pose prediction can be trusted more if two messages have more spatial overlap. A Gamma prior: $p(w_{ji}) = \Gamma(w_{ji} | o_{ji}, k)$, where k can be a shape parameter. To perform inference on the MRF, the first autonomous vehicle can estimate values of the absolute poses $\xi_i$, the scale parameters $\Sigma_i$, and the weights $w_{ji}$ that maximize the product of the pairwise potentials. This can be done using iterated conditional modes described by the algorithm:

1: $\xi_i \leftarrow \xi_i$ i=1 . . . n

2: $w_{ji} \leftarrow 1$ (i, j)$\in$E

3: for k=1 . . . num_iters do

4:

$$\xi_i, \sum_i \leftarrow \text{argmax}_{\xi_i, \Sigma_i} \prod_{j \in adj(i)} p\left(\hat{\xi}_{ji} \circ \xi_j\right)^{\omega_{ji}} p\left(\hat{\xi}_{ij}^{-1} \circ \xi_j\right)^{\omega_{ij}} \quad i = 1 \ldots n$$

5: $w_{ji} \leftarrow \text{argmax}_{w_{ji}}\, p(w_{ji} | \xi_i, \Sigma_i)$ (i, j)$\in$E 6: end for 7: return $\xi_i$ i=1 . . . n The maximization step on line 4 can happen simultaneously for all nodes via weighted expectation maximization (EM) for the t distribution. The maximization step on Line 5 can be computed using the closed form:

$$\underset{w_{ji}}{\text{argmax}}\ p\left(w_{ji} | \xi_i, \sum_i\right) = \frac{o_{ji} k}{k - \log p\left(\hat{\xi}_{ji} \circ \xi_j\right) - \log p\left(\hat{\xi}_{ji}^{-1} \circ \xi_i\right)}.$$

The absolute poses can be used to update the relative transformations needed to warp the messages.

The first autonomous vehicle (e.g., its onboard vehicle computing system) can generate an updated intermediate environmental representation based, at least in part, on the first intermediate environmental representation, the second intermediate environmental representation, and/or the third environmental representation. In addition, or alternatively, the updated intermediate environmental representation can be generated based, at least in part, on the first, second, and/or third relative poses. In some implementations, the updated intermediate environmental representation can be generated based, at least in part, on the first, second, and/or third absolute poses.

The updated intermediate environmental representation can be generated using a machine-learned aggregation model (e.g., one or more portions of the machine-learned detection and prediction model, etc.). For example, the machine-learned aggregation model used to create the updated intermediate environmental representation can include a neural network (and/or one or more layers thereof). The machine-learned aggregation model can be configured to aggregate a plurality of intermediate environmental representations from a plurality of autonomous vehicles. For instance, the first autonomous vehicle can determine an updated intermediate environmental representation based at least in part on the first intermediate environmental representation, the second intermediate environmental representation generated by the first transmitter autonomous vehicle, and/or the third intermediate environmental representation generated by the second transmitter autonomous vehicle. By way of example, the first autonomous vehicle (e.g., its onboard vehicle computing system) can input the first intermediate environmental representation, the second intermediate environmental representation, and/or the third intermediate environmental representation into the machine-learned aggregation model. The machine-learned aggregation model can be configured to aggregate the intermediate environmental representation(s) to create the updated intermediate environmental representation. The first autonomous vehicle can obtain the updated intermediate environmental representation as an output of the machine-learned aggregation model.

The machine-learned aggregation model can include a graph neural network that includes a plurality of nodes. Each node of the graph neural network can correspond to a respective autonomous vehicle (e.g., first, second, third, etc. autonomous vehicle) of a plurality of autonomous vehicles within the environment of the first autonomous vehicle. This can include, for example, vehicles within the communication range of the first autonomous vehicle. Each node can represent a respective set of spatial coordinates (e.g., an estimated, relative, or absolute pose) of a respective autonomous vehicle (e.g., the first, second, etc. transmitter vehicles).

The machine-learned aggregation model can be configured to transform inputted intermediate environmental representation(s) based at least in part on a set of spatial coordinates associated with the transmitter autonomous vehicle. For instance, the machine-learned aggregation model can be configured to initialize a node state of at least one node of the graph neural network and update the node state of the at least one node based at least in part on a spatial transformation. For instance, in the graph neural network, each node can maintain a state representation. At each iteration, messages can be sent between nodes of the graph and the node states for each node can be updated based, at least in part, on the aggregated received information (e.g., of the messages) using a neural network. Graphs for different vehicles can be different, as each vehicle can receive communications from one or more different vehicles (the set of vehicles within one vehicle's communication range may be different than the vehicles within another vehicle's communication range).

In some implementations, the machine-learned aggregation model can generate a second transformed intermediate environmental representation by transforming the second intermediate environmental representation based, at least in part, on the absolute pose of the second autonomous vehicle. For example, the machine-learned aggregation model can generate a second transformed intermediate environmental representation by transforming the second intermediate environmental representation based, at least in part, on the one or more second updated spatial coordinates and/or the second updated orientation for the second autonomous vehicle. In addition, or alternatively, the machine-learned aggregation model can generate a third transformed intermediate environmental representation by transforming the third intermediate environmental representation based, at least in part, on the absolute pose of the third autonomous vehicle. For example, the machine-learned aggregation model can generate the third transformed intermediate environmental representation by transforming the third intermediate environmental representation based, at least in part, on the one or more third updated spatial coordinates and/or the third updated orientation for the third autonomous vehicle. By way of example, each vehicle node of the neural network can represent the updated spatial coordinates and/or orientation of each respective autonomous vehicle.

The first autonomous vehicle (e.g., the machine-learned aggregation model) can perform message passing to share features between the vehicle nodes. At iteration 1, for vehicle node i sending a message m(l)i→k to vehicle node k, the first autonomous vehicle can apply a relative spatial transformation ξi→k to warp the state at node i to the feature space of node k:

$$m_{i\to k}^{(l)} = T\left(h_i^{(l)}, \xi_{i\to k}\right)\cdot M_{i\to k}$$

where T applies the spatial transformation and resampling of the feature state via bilinear-interpolation, and $M_{i\to k}$ masks out out-of-bound regions after warping. This can be helpful because portions of the transmitter autonomous vehicle features may be further away than the first autonomous vehicle's current range.

The first autonomous vehicle can aggregate the received messages at node i via an aggregation function φ (e.g., sum, mean, pooling) and update the node state with a ConvGRU:

$$h_i^{(l+1)} = ConvGRU\left(h_i^{(l)}, \phi\left(\left[\forall_{j\in N(i)}, m_{j\to i}^{(m)}\right]\right)\right)$$

where j∈N(i) are the neighboring nodes in the network for node i and φ is the mean operator. After the final iteration, a multilayer perceptron can output the updated intermediate environmental representation:

$$z_j^{(L)} = MLP\left(h_j^{(L)}\right)$$

In some implementations, the second portion of the machine-learned detection and prediction model (e.g., the machine-learned aggregation model) can include a machine-learned attention model configured to weigh a plurality of intermediate environmental representations before generating the updated intermediate environmental representation. For example, the machine-learned attention model can determine a first weight for the second intermediate environmental representation and/or a second weight for the third intermediate environmental representation. Each weight can be indicative of a predicted accuracy of an estimated pose. For example, the first weight can be indicative of a first predicted accuracy of the second estimated pose and/or the second weight can be indicative of a second predicted accuracy of the third estimated pose. The first autonomous vehicle (e.g., machine-learned aggregation model) can assign the second weight to the second transformed intermediate environmental representation and/or the third weight to the third transformed intermediate environmental representation. The updated intermediate environmental representation can be generated, via the machine-learned aggregation model (e.g., a second portion of the machine-learned detection and prediction model), based, at least in part, on the first and second weights.

More particularly, after the predicted relative transformations are generated, there may still be errors present in some messages that hinder the first autonomous vehicle's performance. To mitigate such errors, the machine-learned aggregation model (e.g., via the attention model) can prioritize messages (e.g., intermediate environmental representations) to focus on clean messages and ignore noisy ones. To do so, a weight can be assigned to each transformed intermediate environmental representation before the representations are averaged, to suppress the remaining noisy representations. The machine-learned aggregation model can use a convolutional neural network A to predict an unnormalized weight $s_{ji}\in\mathbb{R}$. For example, sigmoid $(A(m_i\|m_{ji}))=s_{ji}$. The normalized weight $\alpha_{ji}\in\mathbb{R}$ can be computed by:

$$a_{ji} = \frac{s_{ji}}{\alpha + \sum_{k\in adj(i)} s_{ki}}.$$

The learned parameter $\sigma\in\mathbb{R}$ can allow the model to ignore all incoming messages if needed. In this manner, if all the incoming messages are noisy, the resulting weights can be large after the normalization. The updated intermediate environmental representation can be computed by:

$$h_i = G(\{a_{ji} m_{ji}\}_{j \in adj(i)})$$

The first autonomous vehicle can generate an autonomy output for the first autonomous vehicle based at least in part on the updated intermediate environmental representation. The autonomy output can be indicative of a bounding shape associated with an object within the environment of the recipient autonomous vehicle and one or more predicted future locations of the object. For example, the autonomy output can include one or more bounding boxes indicative of one or more objects within the surrounding environment of the first autonomous vehicle. In some implementations, to generate the autonomy output, the first autonomous vehicle can utilize the machine-learned detection and prediction model (and/or a second portion of the model). The machine-learned detection and prediction model can be configured to generate the autonomy output(s). The joint detection and prediction model can include several memories and networks. For example, the joint detection and prediction model can include a plurality of network branches (e.g., a branch for detection, a branch for prediction, etc.), a plurality of memories (e.g., an appearance memory, object path memory, etc.) as well as an object path proposal network and a path refinement network.

The first autonomous vehicle can input the updated intermediate environmental representation into the machine-learned detection and prediction model and obtain the autonomy output as an output of the machine-learned detection and prediction model. For instance, the first autonomous vehicle can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates, respectively. The output of the detection branch can be parameterized as (x, y, w, h, θ), which denotes the position, size, and orientation of objects. This can be represented as a bounding shape associated with an object within the environment of the first autonomous vehicle. The output of the prediction branch can be parameterized as ($x_t$, $y_t$), which denotes the object's location at future time step t. This can indicate one or more future location(s) of the object. The autonomy output can be indicative of the output of the detection branch and the prediction branch (e.g., a bounding shape and predicted future location(s)).

The first autonomous vehicle (e.g., its onboard vehicle computing system) can generate a motion plan for the first autonomous vehicle based at least in part on the autonomy output. For example, the first autonomous vehicle can include a motion planning system. The motion planning system can determine a motion plan and generate motion plan data for the first vehicle based at least in part on the autonomy output. The motion plan can be generated based at least in part on the autonomy output in that it can consider an object (and/or its future location(s)) described in the autonomy output when planning the motion of the first autonomous vehicle, whether that is overridden by other factors (e.g., other objects, unexpected occurrences, etc.) or eventually effects the actual motion of the vehicle. The motion plan data can include vehicle actions, trajectories, waypoints, etc. with respect to the objects proximate to the first autonomous vehicle as well as the predicted movements. For example, the motion planning system can include one or more machine-learned models/optimization algorithms that consider cost data associated with a vehicle action as well as other objective functions (e.g., cost functions based, at least in part, on speed limits, traffic lights, and/or other aspects of the environment), if any, to determine optimized variables that make up the motion plan data. By way of example, the motion planning system can determine that the vehicle can perform a certain action (e.g., stop for an object) without increasing the potential risk to the vehicle and/or violating any traffic laws (e.g., speed limits, lane boundaries, signage, etc.). The motion plan data can include a planned trajectory, velocity, acceleration, and/or other actions.

The first autonomous vehicle (e.g., its onboard vehicle computing system) can initiate a motion control of the first autonomous vehicle based at least in part on the motion plan. A motion control can include an action to implement, change, continue, and/or otherwise affect the motion of the first autonomous vehicle. The motion planning system can provide the motion plan data indicative of the vehicle actions, a planned trajectory, and/or other operating parameters to the vehicle control systems to implement the motion plan data for the vehicle. For instance, the vehicle can include a vehicle interface configured to translate the motion plan data into instructions. By way of example, the vehicle interface can translate motion plan data into instructions for controlling the first vehicle including adjusting the steering of the vehicle "X" degrees and/or applying a certain magnitude of braking force to avoid interfering with an object indicated in the autonomy output. The vehicle interface can send one or more control signals to the responsible vehicle control component (e.g., braking control system, steering control system, and/or acceleration control system) to execute the instructions and implement the motion plan data. In this way, the first vehicle can account for and control its motion with respect to object(s) outside of the normal field of view of the first vehicle but within the field of view of the transmitter autonomous vehicle(s).

The machine-learned model(s) of the described system can be trained in several stages. For instance, a sensor backbone (e.g., LIDAR backbone for helping to create the intermediate environmental representation) and output headers can be pre-trained on a real-LIDAR single-vehicle dataset, bypassing the cross-vehicle aggregation stage. The loss function can be cross-entropy on a vehicle classification output and smooth l1 on the bounding box parameters. Hard-negative mining can be applied as well to improve performance. The sensor backbone (e.g., LIDAR backbone), cross-vehicle aggregation, and output header models can be jointly fine tuned on a simulated vehicle-to-vehicle dataset (described below) with synchronized inputs (e.g., no time delay) using the same loss function. The training can avoid the use of a temporal warping function at this stage. During training, for every example in the minibatch, the number of connected vehicles can be randomly sampled uniformly on [0, min(c, 6)], where c is the number of candidate vehicles available. This can help ensure that the architecture of the machine-learned model(s) can handle arbitrary graph connectivity while also making sure the fraction of vehicles in the scene/ecosystem on the network remains reasonable.

In some implementations, the machine-learned detection and prediction model and machine-learned attention model can be trained together. For example, identifying noisy examples can be treated as a supervised binary classification task, where clean examples can be assigned a high value and noisy examples can be assigned a low value. For the data and labels, strong noise can be generated and applied to some vehicles and weak pose noise to others within one scene. The noise can be generated via $n_i \sim D_w$ or $n_i \sim D_s$, where $D_w$ is a distribution of weak pose noises, and $D_s$ is strong noises. The noise can have two translational components and a rotational component, thus $n_i \in \mathbb{R}^3$. A fixed proportion p of autonomous vehicles can receive noise from the strong distribution while the rest can receive noise from the weak distribution. When considering an intermediate environmental representation, the representation is considered clean when both autonomous vehicles have noise from the weak distribution and considered noisy when either vehicle has noise from the strong distribution. As an example, the labeling can include:

$$\text{label}(j, i) = \begin{cases} \gamma & n_j \sim \mathcal{D}_w \text{ and } n_i \sim \mathcal{D}_w, \\ 1-\gamma & n_j \sim \mathcal{D}_s \text{ or } n_i \sim \mathcal{D}_s. \end{cases}$$

The function can produce smooth labels to temper the attention model's predictions so that the attention weights are not just 0 or 1. The loss for the joint training task can be defined as follows:

$$\mathcal{L}_{joint}\left(y_i, \hat{y}_i, \{s_{ji}\}_{j \in adj(i)}\right) = \lambda_{PnP} L_{PnP}(y_i, \hat{y}_i,) + \frac{\lambda_{attn}}{|adj(i)|} \sum_{j \in adj(i)} \mathcal{L}_{CE}(\text{label}(j, i), s_{ji}).$$

where LCE can be a binary cross entropy loss.

In addition, or alternatively, the machine-learned detection and prediction model and the machine-learned attention model can be frozen and only the regression model can be trained using $L_c$. In this stage, all autonomous vehicle(s) can be assigned noise from the strong noise distribution $D_s$. The machine-learned regression model can be trained using a loss which is a sum of losses over each coordinate:

$$\mathcal{L}_C\left(\xi_{ji}, \hat{\xi}_{ji}\right) = \sum_{k=1}^{3} \lambda_k \mathcal{L}_{sl1}\left(\xi_{ji}, \hat{\xi}_{ji}\right) k,$$

with $\lambda = [\lambda_{pos}, \lambda_{pos}, \lambda_{rot}]$. $L_{sl1}$ can be the smooth $l_1$ loss.

The machine-learned detection and prediction model and the machine-learned regression model can be trained end-to-end via backpropagation. For example, the entire network can be fine-tuned end-to-end with the combined loss: $L = L_c + L_{joint}$. This can be possible because the MRF inference algorithm can be differentiable via backpropagation.

The simulated vehicle-to-vehicle dataset (used for training) can be created using a sensor simulation system. The sensor simulation system can use a large catalog of 3D static scenes and dynamic objects that are built upon real-world data collections to provide a set of rich and diverse assets from which to simulate new scenarios. The sensor simulation system can apply raycasting and machine learning to generate a realistic sensor point cloud such as, for example, a LIDAR point cloud. The sensor simulation system can allow for the creation of vehicle-to-vehicle scenes where a percentage of the vehicles are autonomous vehicles and generate realistic sensor data (e.g., LIDAR data) at different vehicle locations.

The simulations can be based, at least in part, on snippets (e.g., 25-second snippets, etc.) of labeled data recorded by an autonomous vehicle in the real world, which contains temporal tracks of the bounding boxes of all agents in the scene with respect to the recording vehicle. To generate the simulated vehicle-to-vehicle dataset, a real-world snippet can be recreated in a simulated virtual world using these ground-truth tracks. By using the same scenario layouts and agent trajectories recorded from the real world, the simulation system can replicate realistic traffic and vehicle motion for vehicle-to-vehicle dataset generation. At each timestep, actor 3D-assets can be placed into the virtual scene according to real-world labels and generate the sensor data (e.g., LIDAR point cloud data, etc.) at different candidate vehicle locations. Candidate autonomous vehicles can be non-parked vehicles that are within a communication range (e.g., a 50-meter broadcast range) of a subject vehicle in the scene (e.g., the autonomous vehicle that recorded the snippet in the real-world). This data generation approach allows for the generation of more realistic and diverse topologies of vehicle-to-vehicle communication networks.

It should be understood that each autonomous vehicle within the ecosystem (e.g., within a communication range) can perform the functions of a transmitter autonomous vehicle and the functions of a recipient autonomous vehicle as described above. As such, an autonomous vehicle can not only communicate an intermediate environmental representation to other autonomous vehicles but can also receive intermediate environmental representations from other autonomous vehicles. In some implementations, the autonomous vehicle(s) can also, or alternatively, send and receive autonomy outputs (e.g., of the joint detection/prediction model) and/or sensor data among one another.

The systems and methods described herein provide a number of technical effects and benefits. More particularly, the systems and methods of the present disclosure provide improved techniques for training machine learned models utilized by autonomous vehicles to perceive a surrounding environment. For instance, a computing system can include a machine-learned model that can enable the system to perceive its environment based, at least in part, on sensor data descriptive of the system's environment. The system can receive the sensor data, via a communication channel, that can be susceptible to poor localization from associated autonomous vehicles. Particularly, pose errors at an associated autonomous vehicle can cause the machine-learned model to output inaccurate positions and classes of objects within the system's environment. The systems and methods of the present disclosure describe techniques for training the machine-learned model to identify pose errors associated with messages received over a communication channel from one or more autonomous vehicles before using the information for perceiving a system's surrounding environment. The information can be transformed and prioritized based, at least in part, on the identified pose errors before being used for perceiving a system's surrounding environment. In this way, the systems and methods described herein provide a practical improvement to autonomous vehicle safety, navigation, perception, and prediction by enabling a system to detect and compensate for pose errors common in the realm of autonomous vehicle computing technology.

Example aspects of the present disclosure can provide an improvement to computing technology, such as autonomous vehicle computing technology. For example, the present disclosure describes a computing system configured to obtain sensor data associated with an environment of the system and estimated location data indicative of a first estimated pose of the system. The computing system can determine a first intermediate environmental representation of at least a first portion of the environment of the first autonomous vehicle based, at least in part, on the sensor data. The computing system can obtain a first message from a second autonomous vehicle with a second intermediate environmental representation of at least a second portion of the environment of the first autonomous vehicle and second estimated location data indicative of a second estimated pose of the second autonomous vehicle. The computing system can determine a first relative pose between the system and the second autonomous vehicle based, at least in part, on the intermediate environmental representation and the second intermediate environmental representation. The computing system can generate an updated intermediate environmental representation based, at least in part, on the first intermediate environmental representation, the second intermediate environmental representation, and the first relative pose. And the computing system can generate an autonomy output for the system based, at least in part, on the updated intermediate environmental representation.

In this manner, the computing system can accumulate and utilize newly available information in the form of one or more relative and/or absolute poses to provide a practical improvement to machine-learning technology (e.g., machine-learning training technology). The relative and/or absolute poses can be used to correct pose errors inherent in autonomous vehicle communications. As a result, the computing system can improve the accuracy and usability of autonomous vehicle communications. This, in turn, improves the functioning of machine-learning systems and autonomous vehicle computing technology in general by increasing the reliability and accuracy of information shared by autonomous vehicles during collaborative detection and prediction tasks. Ultimately, the computing techniques disclosed herein result in more accurate machine-learned systems; thereby improving an autonomous vehicle's perception, prediction, and motion through its environment and enhancing the safety of self-driving systems.

Various means can be configured to perform the methods and processes described herein. For example, a computing system can include data acquisition unit(s), intermediate representation generation unit(s), relative pose unit(s), absolute pose unit(s), aggregation unit(s), detection/prediction unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data acquisition unit(s), etc.) can be configured to obtain, via one or more sensors, sensor data associated with a surrounding environment of the autonomous vehicle. The means (e.g., data acquisition unit(s), etc.) can be configured to obtain a first estimated location data indicative of a first estimated pose of the autonomous vehicle. The means (e.g., data acquisition unit(s), etc.) can be configured to obtain a first message from a second autonomous vehicle. The first message can include a second intermediate environmental representation of at least a second portion of the surrounding environment of the first autonomous vehicle and second estimated location data indicative of a second estimated pose of the second autonomous vehicle. The means (e.g., data acquisition unit(s), etc.) can be configured to obtain a second message from a third autonomous vehicle. The second message can include a third intermediate environmental representation of at least a third portion of the surrounding environment of the autonomous vehicle and third estimated location data indicative of a third estimated pose of the third autonomous vehicle.

The means (e.g., intermediate representation unit(s), etc.) can be configured to determine a first intermediate environmental representation of at least a first portion of the surrounding environment of the autonomous vehicle based, at least in part, on the sensor data. The means (e.g., relative pose unit(s), etc.) can be configured to determine a first relative pose between the autonomous vehicle and the second autonomous vehicle based, at least in part, on the first intermediate environmental representation and the second intermediate environmental representation, a second relative pose between the autonomous vehicle and the third autonomous vehicle based, at least in part, on the first intermediate environmental representation and the third environmental representation, and a third relative pose between the second autonomous vehicle and the third autonomous vehicle based, at least in part, on the second intermediate environmental representation and the third environmental representation.

The means (e.g., absolute pose unit(s), etc.) can be configured to determine at least one of a first absolute pose for the autonomous vehicle, a second absolute pose for the second autonomous vehicle, or a third absolute pose for the third autonomous vehicle based, at least in part, on the first relative pose, the second relative pose, and/or the third relative pose. The means (e.g., aggregation unit(s), etc.) can be configured to generate an updated intermediate environmental representation based, at least in part, on the first intermediate environmental representation, the second intermediate environmental representation, the third intermediate environmental representation, and the at least one of the first absolute pose, the second absolute pose, and/or the third absolute pose. The means (e.g., detection and prediction unit(s), etc.) can be configured to generate an autonomy output for the autonomous vehicle based, at least in part, on the updated intermediate environmental representation.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical takeoff and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, correcting pose errors with an aggregated feature map, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g., intranet), wide area network (e.g., Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor (s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that are within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein for providing an intermediate environmental representation, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
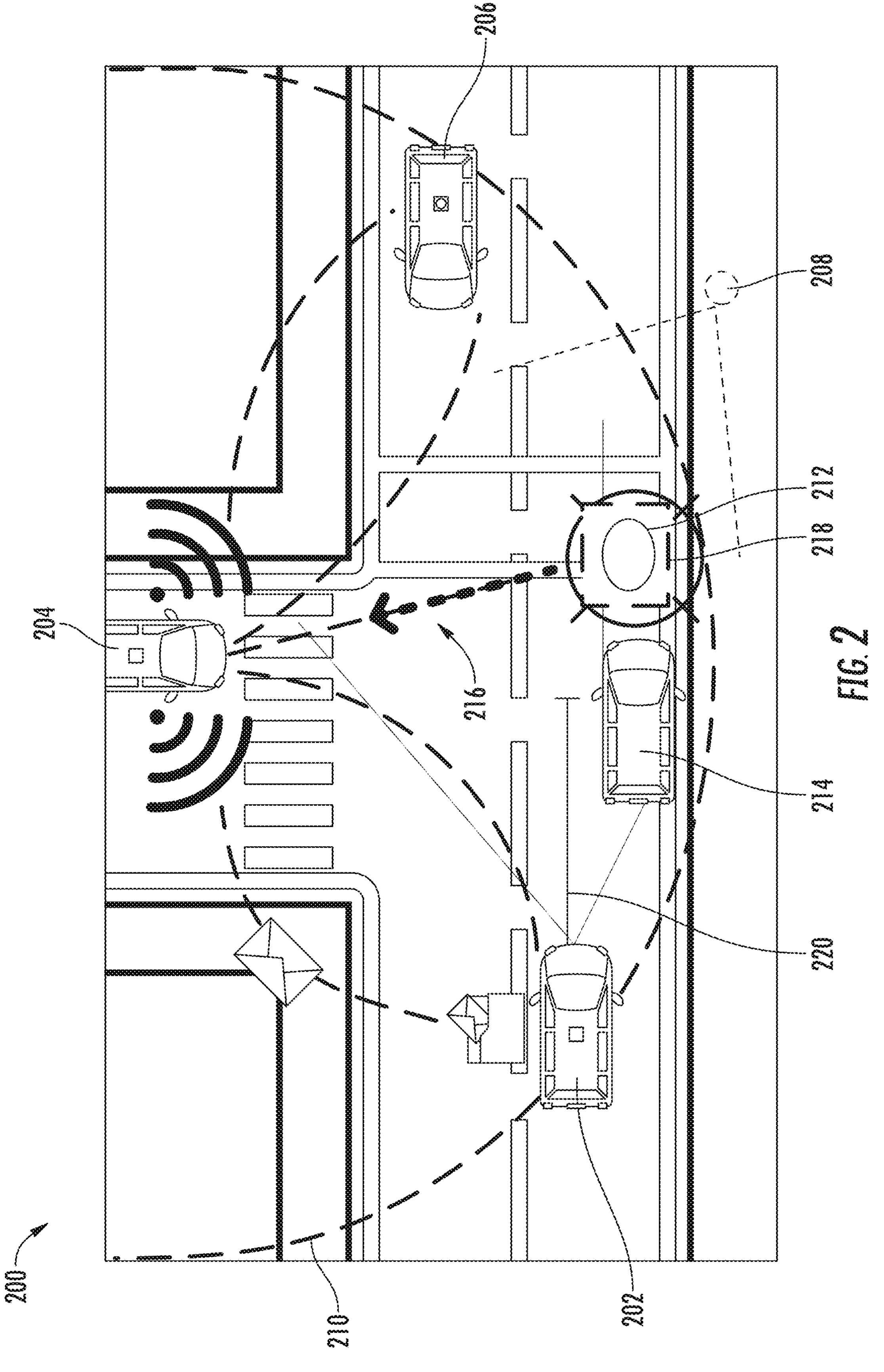
FIG. 2 depicts an example geographic area with a vehicle ecosystem according to example embodiments of the present disclosure.

Autonomous vehicles can operate within geographic areas or have operating domains that can include other autonomous vehicles. For instance, FIG. 2 depicts an example geographic area 200 with a vehicle ecosystem according to example embodiments of the present disclosure. A plurality of autonomous vehicles 202, 204, 206 can be located within the geographic area 200. The plurality of autonomous vehicles can include, for example, a first autonomous vehicle 202, a second autonomous vehicle 204, a third autonomous vehicle 206, etc. The first autonomous vehicle 202, second autonomous vehicle 204, and/or third autonomous vehicle 206 can be associated with the same fleet operator/owner or a different fleet operator/owner. The first autonomous vehicle 202, second autonomous vehicle 204, and/or third autonomous vehicle 206 can be the same or different types and/or versions of vehicle. Each of the first autonomous vehicle 202, second autonomous vehicle 204, and/or third autonomous vehicle 206 can be configured similar to the vehicle 102 described with reference to FIG. 1 and can include the same or similar vehicle computing system(s), functions, operations, etc.

In some implementations, the first autonomous vehicle 202, second autonomous vehicle 204, and/or third autonomous vehicle 206 can be utilized to provide a vehicle service. For example, an autonomous vehicle 202, 204, 206 can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system (e.g., operations computing system 104 of FIG. 1) of the service entity can help to coordinate the performance of vehicle services by autonomous vehicles 202, 204, 206. For instance, the operations computing system 104 can include a service platform. The service platform can include a plurality of back-end services and front-end interfaces, which are accessible via one or more APIs. For example, an autonomous vehicle 202, 204, 206 and/or another computing system that is remote from the autonomous vehicle (but associated therewith) can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle 202, 204, 206 to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles 202, 204, 206 that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle 202, 204, 206 can go online with a service entity by, for example, connecting with the service entity's operations computing system (e.g., the service platform) so that the vehicle's computing system can communicate with the operations computing system via one or more networks. Once online, the operations computing system can communicate a vehicle service assignment indicative of the requested vehicle services and/or other data to the autonomous vehicle 202, 204, 206.

The geographic area 200 can include one or more travel ways (e.g., roadways, etc.) and one or more geographic features (e.g., cross walks, lane boundaries, etc.). In some implementations, the geographic area 200 can include one or more infrastructure elements 208 that include systems with communication technology capable of communicating with one or more of the autonomous vehicles 202, 204, 206 within the geographic area 200. As further described herein, the infrastructure elements 208 can provide sensor data and/or intermediate environmental representations to the autonomous vehicles 202, 204, 206. The infrastructure element(s) 208 can include, for example, a sensor suite/system attached and/or included in a building or other structure such as, for example, a lamppost, traffic light, etc.

The geographic area 200 can also include one or more objects. The objects can include, for example, static object (s) (e.g., lampposts, parking meters, etc.) and/or dynamic actor objects (e.g., pedestrians, vehicles, bicycles/bicyclists, etc.) that are and/or may be in motion. By way of example, the geographic area 200 can include an object 212. The object 212 can be within the field of view of sensors associated with one or more of the autonomous vehicles within the geographic area 200 (e.g., first autonomous vehicle 202, third autonomous vehicle). The object 212 can be occluded from a field of view of one or more sensors of the second autonomous vehicle 204. The object 212 can include, for example, a user that is associated with a service request for a vehicle service. An autonomous vehicle 202, 204, 206 can be assigned to the service request and, thus, may attempt to detect the user so that the user can board, enter, etc. the assigned autonomous vehicle, the vehicle's doors can be unlocked, the vehicle can send a message to the user, etc. In some implementations, the geographic area 200 can include one or more non-autonomous vehicles such as, for example, non-autonomous vehicle 214.

Each of the plurality of autonomous vehicles 202, 204, 206 can include a communication system that allows the respective vehicle's computing system to communicate with system(s) that are remote from the autonomous vehicle 202, 204, 206. For example, an autonomous vehicle 202, 204, 206 can utilize its communication system to send and receive data (e.g., via an internet connection) from a cloud-based server system that helps support the autonomous vehicle 202, 204, 206. This can include, for example, an offboard service assignment system that matches the autonomous vehicle to a request for a vehicle service (e.g., rideshare service), a routing system that provides the autonomous vehicle 202, 204, 206 with a route to follow for performing the vehicle service, a remote assistance system that can provide remote assistance to a vehicle, and/or other systems.

Each autonomous vehicle 202, 204, 206 can also have a communication range that allows the autonomous vehicle 202, 204, 206 to communicate with systems nearby the autonomous vehicle 202, 204, 206. For example, a first autonomous vehicle 202 (e.g., a recipient vehicle) can have a communication range 210. The communication range 210 can be based at least in part on the vehicle's communication hardware (e.g., antenna, etc.). Additionally, or alternatively, the communication range 210 can be based at least in part on the communication protocol utilized by the first autonomous vehicle 202. The communication range 210 can be represented by a radial distance from the first autonomous vehicle 202. The autonomous vehicle 202 can communicate with autonomous vehicle(s) 204, 206 within the communication range 210. For example, the second autonomous vehicle 204 (a "transmitter autonomous vehicle") can communicate data to the first autonomous vehicle 202 ("a recipient autonomous vehicle" that is different from the second autonomous vehicle 204) that is within the first communication range 210 of the first autonomous vehicle 202.

The first autonomous vehicle 202 can receive data from any number of autonomous vehicles (e.g., a third autonomous vehicle 206 (e.g., "a second transmitter vehicle")) within the communication range 210 of the autonomous vehicle 202. The systems and methods of the present disclosure can allow the ecosystem of autonomous vehicles/systems within a geographic area 200 to provide inter-vehicle/system communications that improve the vehicles'/systems' autonomous operations while reducing the communication bandwidth and potential information loss associated with doing so.

Figure 3:
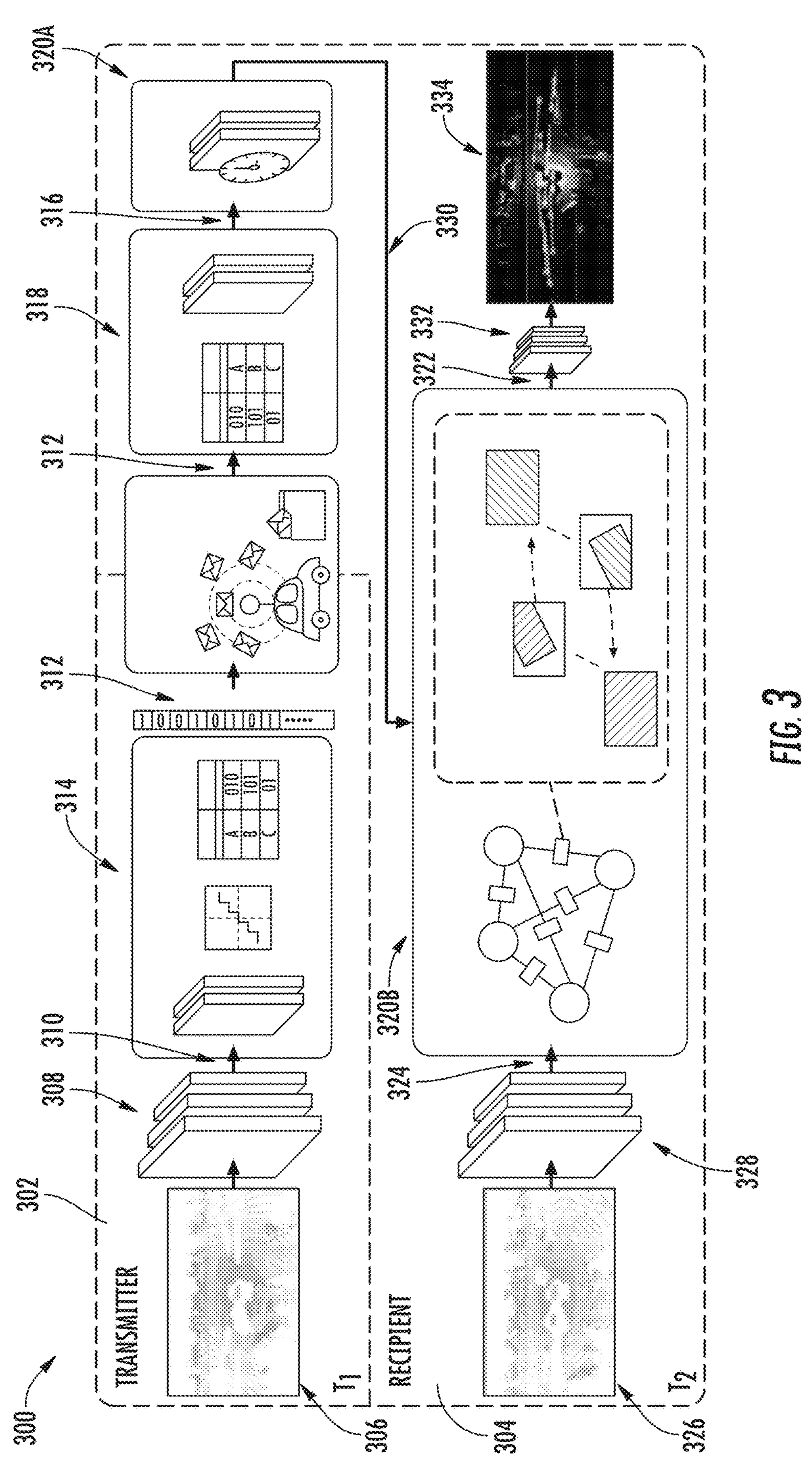
FIG. 3 depicts an architecture of example machine-learned models according to example embodiments of the present disclosure.

FIG. 3 depicts a diagram of an architecture 300 of example machine-learned model(s) that can allow for such improvements. The diagram illustrates the architecture 300 across two systems. This can include a transmitter system 302 and a recipient system 304. In some implementations, the recipient system 304 can include a first/recipient autonomous vehicle 202 (e.g., its onboard vehicle computing system) and the transmitter system 302 can include a second/transmitter autonomous vehicle 204 (e.g., its onboard vehicle computing system).

As described herein, the recipient system 304 can be a first computing system of a vehicle, robot, infrastructure element, etc. and the transmitter system 302 can be another computing system of a vehicle, robot, infrastructure element, etc. For example illustration purposes only, the following description is provided within the example context of the first and second autonomous vehicles 202, 204 communicating with one another.

For instance, the transmitter system 302 (e.g., a second/transmitter autonomous vehicle 204, its onboard vehicle computing system, etc.) can obtain (e.g., via the one or more sensors of the first autonomous vehicle 204) sensor data 306 associated with an environment (e.g., a portion of a surrounding environment of another, recipient autonomous vehicle) of the transmitter system 302 (e.g., the second autonomous vehicle 204). The sensor data 306 can include one or more types of sensor data associated with one or more sensor modalities. For example, the sensor data 306 can include three-dimensional point cloud data (e.g., three-dimensional LIDAR point cloud data.). In some implementations, the sensor data 306 can include a fusion of different types of sensor data. For example, the sensor data 306 can include a first type of sensor data (e.g., camera image data) and a second type of sensor data (e.g., LIDAR data). The first type of sensor data can be associated with a first sensor modality (e.g., stereo camera) and the second type of sensor data (e.g., LIDAR data) can be associated with a second sensor modality (e.g., LIDAR system).

In some implementations, the sensor data 306 can include data acquired by multiple different systems (e.g., autonomous vehicles). For example, the sensor data 306 can include a first set of sensor data (e.g., a first set of LIDAR data) acquired by the transmitter system 302 (e.g., the second autonomous vehicle 204) and a second set of sensor data (e.g., a second set of LIDAR data) that was acquired by another system (e.g., another autonomous vehicle 202, 206) in its ecosystem and sent to the transmitter system 302 (e.g., the second autonomous vehicle 204).

The transmitter system 302 (e.g., the second autonomous vehicle 204, its onboard computing system, etc.) can generate an intermediate environmental representation 310 for use by another vehicle (e.g., a first/recipient autonomous vehicle 202). The intermediate representation 310 can be generated based, at least in part, on the sensor data 306 and can be descriptive of at least a portion of an environment of the other autonomous vehicle. As one example, the transmitter system 302 can determine the intermediate representation 310 of at least a portion of the surrounding environment of a second/transmitter autonomous vehicle based at least in part on the sensor data 306. The intermediate representation 310 can include a feature map indicative of at least a portion of the environment. To determine the intermediate environmental representation 310, the transmitter system 302 can generate voxelized sensor data by voxelizing the three-dimensional point cloud data of the sensor data 306. By way of example, the transmitter system 302 can extract raw features from its LIDAR sensor data and transform them into a bird's eye view (BEV). The features can include, for example, a heading and/or shape of an object indicated in the intermediate environmental representation 310. The transmitter system 302 can voxelize the LIDAR point clouds (e.g., in 15 $cm^3$, etc.), apply several convolutional layers, and output feature maps of shape H×W×C, where H×W denotes the scene range in BEV, and C is the number of feature channels.

FIG. 4, for example, depicts a visualization of an example intermediate environmental representation 400 according to example embodiments of the present disclosure.

Turning back to FIG. 3, the intermediate environmental representation 310 can be generated based, at least in part, on a machine-learned model 308 (e.g., a joint detection and prediction model) associated with the transmitting/recipient autonomous vehicles. The machine-learned model 308 associated with the vehicles can include a machine-learned model utilized by the transmitter/recipient systems 302, 304 to perceive (e.g., identify) one or more objects within a surrounding environment and/or predict the motion of the one or more objects. The transmitter system 302 can generate the intermediate environmental representation 310, via a first portion 308 of the machine-learned model (e.g., a convolutional neural network, etc.), based, at least in part, on the sensor data 306. The first portion 308, for example, can include one or more convolutional layers of the machine-learned model. For instance, the transmitter autonomous vehicle can input the voxelized sensor data into the machine-learned model 308. The machine-learned model 308 can be configured to apply one or more convolutional layers to the voxelized sensor data. For example, the machine-learned model 308 can utilize a plurality of layers (e.g., three layers, etc.) of 3×3 convolution filters (e.g., with strides of 2, 1, 2 respectively) to produce the intermediate environmental representation 310. The intermediate environmental representation 310 can be, for example, a 4× down sampled spatial feature map. The feature map can be represented as a matrix generated from the array(s) of the sensor data. The transmitter system 302 can receive the intermediate environmental representation 310 (e.g., an activation of intermediate neural network layers, etc.) as an output of the first portion 308 (e.g., one or more first (e.g., intermediate) neural network layers) of the machine-learned model.

The transmitter system 302 (e.g., the second autonomous vehicle 204, its onboard vehicle computing system) can generate a compressed intermediate environmental representation 312 by compressing the intermediated environmental representation 310 of at least the portion of the environment of the transmitter system 302 (e.g., the second autonomous vehicle 204). For instance, the transmitter system 302 can include a machine-learned compressor model 314. The machine-learned compressor model 314 can include an encoder, a quantizer, and entropy coding. A variational image compression algorithm can be used, where a convolutional neural network learns to compress an input (e.g., the first intermediate environmental representation 310) with the help of a learned hyperprior. The latent representation can then be quantized and further encoded losslessly. The feature map of the intermediate environmental representation 310 (e.g., a rectangular tensor) can be compressed into a bitstream.

The transmitter system 302 (e.g., the second autonomous vehicle 204, its onboard vehicle computing system, etc.) can determine a recipient to which to communicate the first compressed intermediate environmental representation 310 from among a plurality of potential recipients. The transmitter system 302 can select the recipient system 304 based at least in part on a communication range of the transmitter system 302. For instance, the transmitter system 302 can determine that it will communicate the compressed intermediate environmental representation 312 to one or more of the other computing systems within its communication range. By way of example, the second autonomous vehicle 204 can select the first autonomous vehicle 202, from among a plurality of autonomous vehicles, based at least in part on a communication range 210 of the autonomous vehicle 202. The second autonomous vehicle 204 can be within the communication range 210 of the first autonomous vehicle 202 and thus may provide the intermediate environmental representation 310 to the first autonomous vehicle 202.

The transmitter system 302 (e.g., the second autonomous vehicle 204, its onboard vehicle computing system, etc.) can communicate the compressed intermediate environmental representation 312 to the recipient system 304 (e.g., the first autonomous vehicle 202, its onboard vehicle computing system, etc.). The compressed intermediate environmental representation 312 can also be associated with a first time $T_1$. For example, the first time $T_1$ can be associated with a sensor timestamp of the transmitter system 302 (e.g., the second autonomous vehicle 204). The sensor timestamp can be indicative of when the sensor data 306 (e.g., utilized to generate the intermediate environmental representation 310)

was acquired by the sensors of the transmitter system 302 (e.g., second autonomous vehicle 204).

The recipient system 304 (e.g., the first autonomous vehicle 204, its onboard computing system, etc.) can obtain the compressed intermediate environmental representation 312, from the transmitter system 302 (e.g., the second autonomous vehicle 204, its onboard vehicle computing system, etc.). The compressed intermediate environmental representation 312 can be indicative of at least a portion of an environment of the recipient system 304 (e.g., the first autonomous vehicle 202). For example, the compressed intermediate environmental representation 312 can be a compressed feature map that was generated based on sensor data captured within a field of view of at least a portion of the environment of the recipient system 304. The recipient system 304 (e.g., the first autonomous vehicle 202) can also obtain compressed intermediate environmental representations from one or more other transmitter systems (e.g., autonomous vehicle 206, infrastructure element 208, etc.).

The recipient system 304 (e.g., the first autonomous vehicle 202, its onboard computing system, etc.) can generate a decompressed intermediate environmental representation 316 by decompressing the compressed intermediate environmental representation 312. For instance, the recipient system 304 can include a decompressor model 318 that includes a decoder and entropy decoding techniques. The decompressed intermediate environmental representation 316 can be generated via the application of the decompressor model 318.

The recipient system 304 (e.g., the first autonomous vehicle 202, its onboard computing system, etc.) can determine, using one or more machine-learned models 320A-B, an updated intermediate environmental representation 322 based at least in part on the decompressed intermediate environmental representation 316 (e.g., originally generated by the second autonomous vehicle 204) and a second intermediate environmental representation 324 generated by the recipient system 304 (e.g., the first autonomous vehicle 202, its onboard computing system, etc.). The recipient system 304 (e.g., the first autonomous vehicle 202, its onboard computing system, etc.) can obtain the second intermediate environmental representation 324 generated by the recipient system 304 (e.g., the first autonomous vehicle 202, its onboard computing system, etc.). For instance, the second intermediate environmental representation 324 can be generated by the recipient system 304 in a manner similar to that previously described with respect to the transmitter system 302. By way of example, the recipient system 304 (e.g., the first autonomous vehicle 202, its onboard computing system, etc.) can obtain sensor data 326 via one or more sensors of the recipient system 304. The recipient system 304 can determine the second intermediate environmental representation 324 based at least in part on the sensor data 326 obtained via the one or more sensors of the recipient system 304. This can be done utilizing a machine-learned model 328 (e.g., a first portion of the machine learned model) that is configured/trained similar to or the same as the machine-learned model 308 (of the transmitter system 302). For example, the machine-learned model 328 can be configured to extract features from the sensor data (e.g., from voxelized three-dimensional sensor data) to create a downsampled spatial feature map.

In some implementations, the one or more models 320A-B used to create the updated intermediate environmental representation 322 can include a machine-learned time correction model 320A. The machine-learned time correction model 320A can include, for example, a neural network. The machine-learned time correction model 320A can be a time delay correction model configured to adjust the decompressed intermediate environmental representation 316 to account for a time delay.

For instance, as described herein, the compressed intermediate environmental representation 312 can be based at least in part on sensor data 306 acquired by the transmitter system 302 (e.g., the second autonomous vehicle 204, its onboard computing system, etc.) at a first time $T_1$. The first time can be, for example, associated with a sensor timestamp of the second autonomous vehicle 202. This can be a sensor timestamp reflecting the time at which the sensor acquired the sensor data 306. The machine-learned time correction model 320A can be configured to compensate for time differences between a plurality of times. For instance, the recipient system 304 can determine, using the machine-learned time correction model 320A, a time-corrected intermediate environmental representation 330 based at least in part on the first decompressed intermediate environmental representation 316. The time-corrected intermediate environmental representation 330 can be adjusted based at least in part on a time difference between the first time $T_1$ and a second time $T_2$ associated with the recipient system 304. The second time can be, for example, indicative of a time at which the recipient system 304 intends to perceive the environment, a time at which the recipient system 304 has acquired its own sensor data to be used for autonomous operations (as described herein), and/or another time. The first time $T_1$ and the second time $T_2$ can be based on similar time scales/references to help ensure accuracy. For example, the first time $T_1$ and the second time $T_2$ can be based on global positioning system data. Accordingly, the time-corrected intermediate environmental representation 330 can account for a time delay associated with the compressed intermediate environmental representation 312 obtained from the transmitter system 302 via the use of one or more machine-learned models (e.g., a time delay correction model, etc.).

The recipient system 304 (e.g., the first autonomous vehicle 202, etc.) can perform one or more autonomy operations (e.g., of the first autonomous vehicle 202, etc.) based at least in part on the time-corrected intermediate environmental representation 330. For instance, the recipient system 304 (e.g., a first autonomous vehicle 202, etc.) can input the decompressed intermediate environmental representation 316 into the machine-learned time correction model 320A (e.g., neural network) and can obtain the time-corrected intermediate environmental representation 330 as an output of the machine-learned time correction model 320A. The recipient system 304 (e.g., a first autonomous vehicle 202, etc.) can generate an updated intermediate environmental representation 322 based at least in part on the time-corrected intermediate environmental representation 330. For example, as further described herein, the recipient system 304 (e.g., the first autonomous vehicle 202, etc.) can aggregate, using a machine-learned aggregation model 320B, the time-corrected intermediate environmental representation 330 and a second intermediate environmental representation 324 generated by the recipient system 304 (e.g., the first autonomous vehicle 202, etc.). The recipient system 304 (e.g., the first autonomous vehicle 202, etc.) can generate an autonomy output 334 based at least in part on the time-corrected intermediate environmental representation 330. For example, the recipient system 304 (e.g., the first autonomous vehicle 202, etc.) can generate an updated intermediate environmental representation 322 based at least in part on the time-corrected intermediate environmental representation 330 and generate the autonomy output 334 based at least in part on updated intermediate environmental representation. As further described herein, the autonomy output 334 can be indicative of, for example, perception data and prediction data associated with the recipient system 304 (e.g., the first autonomous vehicle 202, etc.).

The one or more models used to create the updated intermediate environmental representation can include a machine-learned aggregation model 320B. The machine-learned aggregation model 320B can be configured to aggregate a plurality of intermediate environmental representations from a plurality of sources (e.g., autonomous vehicles). For instance, the recipient system 304 (e.g., the first autonomous vehicle 202, etc.) can determine, using the machine-learned aggregation model 320B, an updated intermediate environmental representation 322 based at least in part on the decompressed intermediate environmental representation 316 and the second intermediate environmental representation 324. As described herein, the decompressed intermediate environmental representation 316 can be adjusted to account for the time delay (using a time delay correction model). Thus, the machine-learned aggregation model 320B can utilize the time-corrected intermediate environmental representation 330 version of the decompressed intermediate environmental representation 316. By way of example, the recipient system 304 (e.g., the first autonomous vehicle 202, etc.) can input the decompressed intermediate environmental representation 316 (e.g., the time-corrected intermediate environmental representation 330 version) and the second intermediate environmental representation 324 (e.g., generated by the first autonomous vehicle 202) into the machine-learned aggregation model 320B. The machine-learned aggregation model 320B can be configured to aggregate the decompressed intermediate environmental representation 316 (e.g., the time-corrected intermediate environmental representation 330 version) and the second intermediate environmental representation 324 to generate the updated intermediate environmental representation 322. The machine-learn aggregation model 320B can ingest other intermediate environmental representations received from other systems (e.g., vehicles, infrastructure elements, etc.) as well. The recipient system 304 (e.g., the first autonomous vehicle 202, etc.) can obtain the updated intermediate environmental representation 322 as an output of the machine-learned aggregation model 320B.

Figure 5:
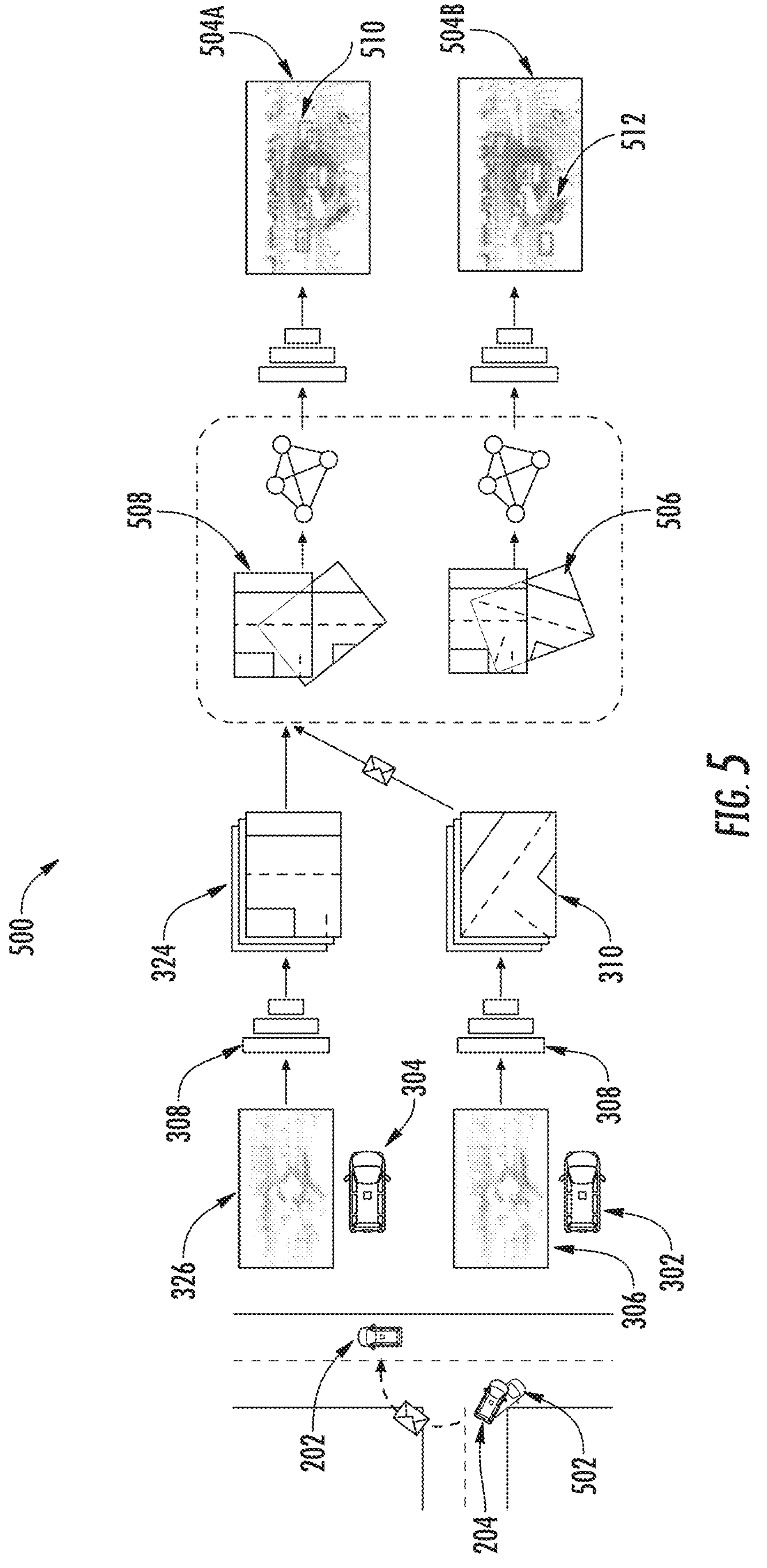
FIG. 5 depicts an example diagram of a multi-agent scenario with one or more estimated pose errors according to example embodiments of the present disclosure.

In this manner, the recipient system 304 (e.g., the first autonomous vehicle 202, etc.) can obtain one or more intermediate environmental representations from one or more different autonomous vehicles. FIG. 5 depicts an example diagram 500 of a multi-agent scenario with one or more estimated pose errors according to example embodiments of the present disclosure. As described herein, the recipient system 304 (e.g., the first autonomous vehicle 202, etc.) can generate a first intermediate environmental representation 324 (e.g., via a first portion 308 of the machine-learned model) based at least in part on sensor data 326 indicative of its surrounding environment. The recipient system 304 (e.g., the first autonomous vehicle 202, etc.) can obtain a second intermediate environmental representation 310 (e.g., generated via a first portion 308 of the machine-learned model by the transmitter system 302) based at least in part on sensor data 306 indicative of another portion of its surrounding environment. The recipient system 304 (e.g., the first autonomous vehicle 202, etc.) can determine an updated intermediate environmental representation 504A, 504B by aggregating the first intermediate environment representation 324 with each of the one or more intermediate environmental representations (e.g., intermediate environmental representation 310). Each intermediate environmental representation can be aggregated based, at least in part, on an estimated pose 502 of the transmitter autonomous vehicle (e.g., second autonomous vehicle 204) associated with the representation (e.g., second intermediate environmental representation 310). Inaccurate estimated poses (e.g., illustrated by alignment 506) of the transmitter autonomous vehicle(s) can interfere with the accuracy of the updated intermediate environment representation 504A, 504B. For example, whereas a correct alignment 508 of the intermediate environmental representations 324, 310 can result in an updated intermediate environment representation 504A correctly depicting objects 510 within the autonomous vehicle's 202 surrounding environment, an incorrect alignment 506 of the intermediate environmental representations 324, 310 can result in an updated intermediate environment representation 504B with one or more inaccuracies 512 within the autonomous vehicle's 202 surrounding environment. The systems and methods disclosed herein prevent inaccuracies with the updated intermediate environmental representations by detecting, correcting, and compensating for inaccurate pose estimates.

Figure 6:
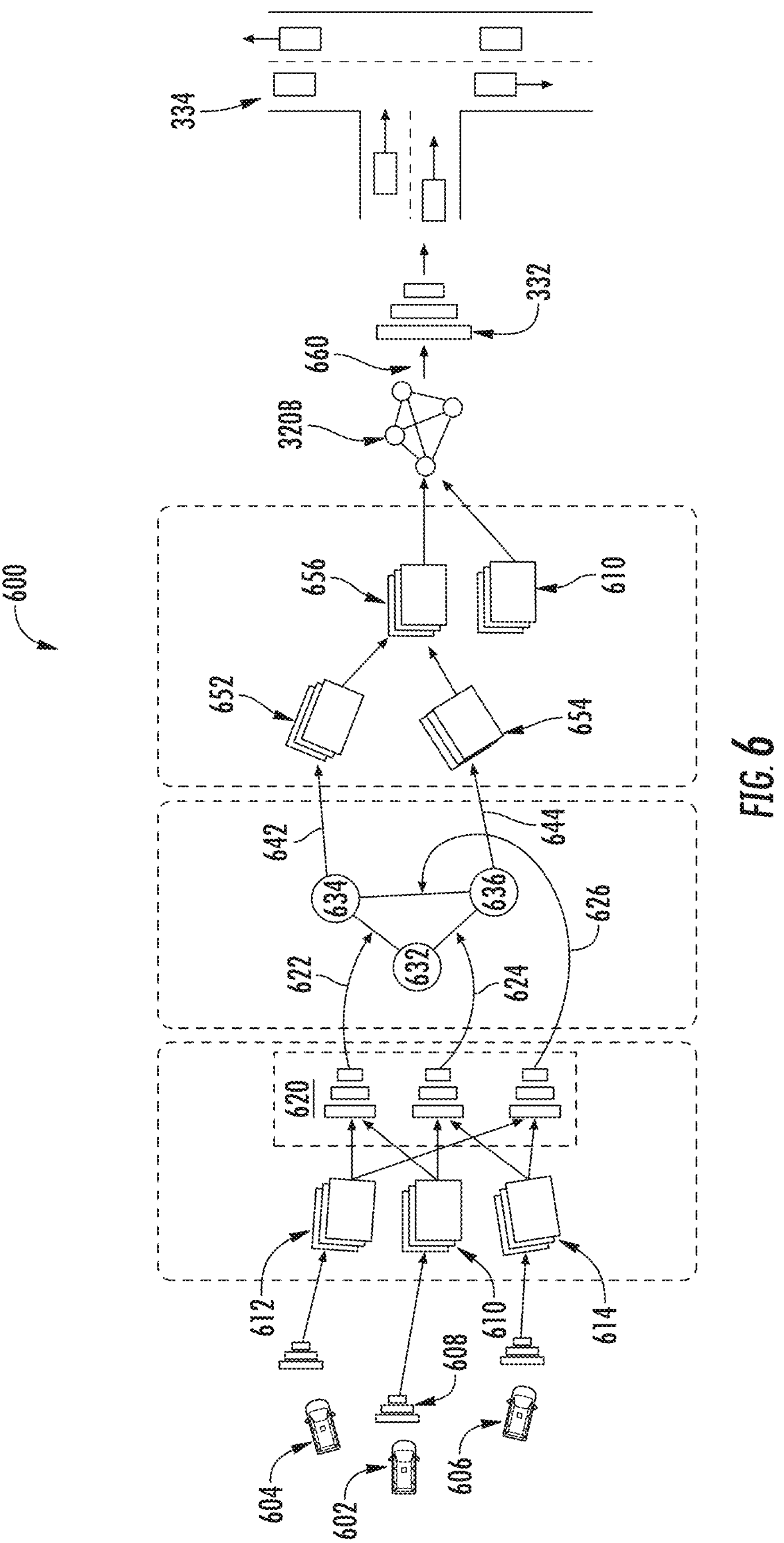
FIG. 6 depicts an architecture of example machine-learned models for correcting pose errors according to example embodiments of the present disclosure.

For example, FIG. 6 depicts an architecture 600 of example machine-learned models for correcting pose errors according to example embodiments of the present disclosure. FIG. 6 depicts a first (e.g., recipient) autonomous vehicle 602 that can obtain (e.g., via one or more sensors of an onboard vehicle computing system) sensor data (e.g., the sensor data described above with reference to the transmitter autonomous vehicle(s) illustrated as vehicle 604, 606 herein) associated with an environment (e.g., a surrounding environment) of the first autonomous vehicle 602. In addition, or alternatively, the first autonomous vehicle 602 can obtain estimated location data indicative of a first estimated pose of the first autonomous vehicle 602. The first autonomous vehicle 602 can generate a first intermediate representation 610 (e.g., via a first portion 608 of the machine-learned model) based on the sensor data (e.g., in the manner described above with reference to FIG. 4).

The first autonomous vehicle 602 (and/or vehicle computing system thereof) can obtain one or more messages from one or more transmitter autonomous vehicle(s) 604, 606 within the environment of the first autonomous vehicle 602. Each message can include an intermediate environmental representation 612, 614 of at least a portion of the environment of the first autonomous vehicle 602 (e.g., from the perspective of a respective transmitter autonomous vehicle 604, 606) and/or estimated location data indicative of an estimated pose of a respective transmitter autonomous vehicle. For example, the autonomous vehicles 602, 604, 606 can obtain estimated location data indicative of an estimated pose of the respective autonomous vehicles. The estimated pose, for example, can be indicative of one or more estimated spatial coordinates and an estimated orientation of the autonomous vehicles 602, 604, 606. By way of example, the autonomous vehicles 602, 604, 606 can include one or more location measurement sensors such as, for example, one or more global positioning systems (e.g., GPSs), inertial measurement units (e.g., IMUs), and/or any other sensors configured to determine a current location and/or orientation of the autonomous vehicles 602, 604, 606. The autonomous vehicles 602, 604, 606 can be configured to obtain the estimated location data from the one or more location measurement sensors.

The first autonomous vehicle 602 can obtain a first message from a second (e.g., a first transmitter) autonomous vehicle 604. The first message can include a second intermediate environmental representation 612 of at least a second portion of the environment of the first autonomous vehicle 602 and/or second estimated location data indicative of a second estimated pose of the second autonomous vehicle 604. In addition, or alternatively, the first autonomous vehicle 602 can obtain a second message from a third autonomous vehicle 606. The second message can include a third intermediate environmental representation 614 of at least a third portion of the environment of the first autonomous vehicle 602 and/or third estimated location data indicative of a third estimated pose of the third autonomous vehicle 606.

For example, the first autonomous vehicle 602 (e.g., denoted as i) can have a noisy estimate of its own pose (e.g., first estimated pose) denoted $\tilde{\xi}_i$, and can receive the noisy poses (e.g., second estimated pose, third estimated pose, etc.) of neighboring autonomous vehicles (e.g., denoted as j) (e.g., second autonomous vehicle 604, third autonomous vehicle 606, etc.) as part of the messages (e.g., first message, second message, etc.). These noisy poses (e.g., first, second, third estimated poses, etc.) can be used to compute noisy relative transformations between the first autonomous vehicle i and j denoted $\widetilde{\xi_{i,j}}$.

For example, the first autonomous vehicle 602 can determine one or more relative poses 622, 624, 626 between each of the associated autonomous vehicles (as represented by nodes 632, 634, 636). For example, the first autonomous vehicle 602 can determine a first relative pose 622 between the first autonomous vehicle 602 and the second autonomous vehicle 604 based, at least in part, on the intermediate environmental representation 610 and the second intermediate environmental representation 612. As another example, the first autonomous vehicle 602 can determine a second relative pose 624 between the first autonomous vehicle 602 and the third autonomous vehicle 606 based, at least in part, on the first intermediate environmental representation 610 and the third intermediate environmental representation 614. In some implementations, the first autonomous vehicle 602 can determine a third relative pose 626 between the second autonomous vehicle 604 and the third autonomous vehicle 606 based, at least in part, on the second intermediate environmental representation 612 and the third intermediate environmental representation 614.

Each relative pose 622, 624, 626 can identify a displacement between one or more autonomous vehicles. For example, the first relative pose 622 can be indicative of a first displacement between the first autonomous vehicle 602 and the second autonomous vehicle 604. The second relative pose 624 can be indicative of a second displacement between the first autonomous vehicle 602 and the third autonomous vehicle 606. The third relative pose 626 can be indicative of a third displacement between the second autonomous vehicle 604 and the third autonomous vehicle 606.

Each relative pose 622, 624, 626 can be determined based, at least in part, on a pair of intermediate environmental representations and/or a machine-learned regression model 620. For example, the first intermediate environmental representation 610 can include a first feature map encoded with a first plurality of encoded features representative of the first portion of the environment. The second intermediate environmental representation 612 can include a second feature map encoded with a second plurality of encoded features representative of the second portion of the environment. The third intermediate environmental representation 614 can include a third feature map encoded with a third plurality of encoded features representative of the third portion of the environment.

Each relative pose 622, 624, 626 can be determined by inputting data indicative of a pair of intermediate environmental representations into the machine-learned regression model 620. For example, the first autonomous vehicle 602 can determine, via the machine-learned regression model 620, the first relative pose 622 between the first autonomous vehicle 602 and the second autonomous vehicle 604. To do so, the first autonomous vehicle 602 can generate an intermediate environmental representation pair by concatenating the first plurality of encoded features (e.g., of the first intermediate environmental representation 612) and the second plurality of encoded features (e.g., of the second intermediate environmental representation 614) along a features dimension. The first autonomous vehicle 602 can input the intermediate environmental representation pair to the machine-learned regression model 620 to obtain the first relative pose 622. For example, the machine-learned regression model 620 can be configured to output the relative pose 622 based, at least in part, on the intermediate environmental representation pair.

By way of example, since each of autonomous vehicle perceives different views (e.g., based, at least in part, on the position and/or orientation of the vehicle) of the same scene, a convolutional neural network (e.g., machine-learned regression model 620) can be used to learn the discrepancy between what a vehicle sees and the orientation of the warped incoming messages. The machine-learned regression model 620 for the ith autonomous vehicle can take $(m_i \| m_{ji})$ as input and outputs a correction $\widehat{c_{ji}}$ such that $\widehat{c_{ji}} \circ \widetilde{\xi_{ji}} = \widetilde{\xi_{ji}}$. $\|$ can denote the concatenation along the features dimension and $\widehat{c_{ji}} \circ \widetilde{\xi_{ji}}$ can represent applying the transformation $\widehat{c_{ji}}$ to the noisy transformation $\widetilde{\xi_{ji}}$. An independent prediction (e.g., relative pose 622, 624, 626) can be determined for each directed edge such that $\widetilde{\xi_{ji}} \neq \widetilde{\xi_{ij}}^{-1}$.

The first autonomous vehicle 602 can determine one or more absolute poses 642, 644 for one or more of the received intermediate environmental representations 612, 614. Each absolute pose, for example, can include updated spatial coordinates and/or orientations for each of the transmitter autonomous vehicles 604, 606. For example, the first autonomous vehicle 602 can determine a first absolute pose indicative of one or more first updated spatial coordinates and/or a first updated orientation for the first autonomous vehicle 602. In addition, or alternatively, the first autonomous vehicle 602 can determine a second absolute pose 642 indicative of one or more second updated spatial coordinates and/or a second updated orientation for the second autonomous vehicle 604. In addition, in some implementations, the first autonomous vehicle 602 can determine a third absolute pose 644 indicative of one or more third updated spatial coordinates and/or a third updated orientation for the third autonomous vehicle 606.

The first autonomous vehicle 602 can determine the first, second, and/or third absolute pose based, at least in part, on the first, second, and/or third relative poses 622, 624, 626. For example, the relative pose estimates can be refined from the machine-learned regression model 620 by finding a set of globally consistent absolute poses among the autonomous vehicles 602, 604, 606 (e.g., first, second, third, etc. autonomous vehicles). By allowing the autonomous vehicles 602, 604, 606 to reach a global consensus about each other's absolute pose, the first autonomous vehicle 602 can mitigate pose error. The absolute poses can be determined using a Markov random field, where each absolute pose is a node (e.g., nodes 632, 634, 636) conditioned on the estimated relative poses 622, 624, 626. The distribution of poses can be conditioned on these can have a heavy tail due to outliers. Each absolute pose (e.g., denoted $\xi_i$) can follow a multivariate student t-distribution with mean $\xi_i \in \mathbb{R}^3$ and scale $\Sigma_i \in \mathbb{R}^{3\times 3}$ given the relative poses.

The pairwise potential can include likelihoods, weights, and/or weight priors defined below. Unary potentials may not be used.

$$\psi(i, j) = \underbrace{p\left(\hat{\xi}_{ji} \circ \xi_j\right)^{w_{ji}} p\left(\hat{\xi}_{ji}^{-1} \circ \xi_j\right)^{w_{ji}}}_{\text{Weighted Liklihood given } \hat{\xi}_{ji}} \underbrace{p\left(\hat{\xi}_{ij} \circ \xi_i\right)^{w_{ij}} p\left(\hat{\xi}_{ij}^{-1} \circ \xi_j\right)^{w_{ij}}}_{\text{Weighted Liklihood given } \hat{\xi}_{ij}} \underbrace{p(w_{ji})p(w_{ij})}_{\text{Weighted Priors}}.$$

The likelihood terms $p(\hat{\xi}_{ji} \circ \xi_j)$ and $$p\left(\hat{\xi}_{ji}^{-1} \circ \xi_j\right),$$

both t-distributed centered at $\xi_i$ can encourage the result of the relative transformation from transmitter vehicles (e.g., second 604, third 606, etc. autonomous vehicles) to stay close to a recipient vehicle (e.g., first autonomous vehicle 602). Both directions are included due to symmetry of the rigid transformations. In some implementations, not all pairwise transformations can provide the same amount of information. Since the machine-learned regression module 620 can produce heavy tailed errors, the edge potentials can down weight erroneous pose regression outputs. For example, a weight $w_{ji}$ scalar for each term in the pairwise potential: $p(\hat{\xi}_{ji} \circ \xi_j)^{w_{ji}}$, so that zero weighted terms can be ignored. The prior distribution for each $w_{ji}$ can be used, where the mean of the distribution $o_{ji}$—the fraction of spatial overlap between two messages. In some implementations, the absolute pose prediction can be trusted more if two messages have more spatial overlap. A Gamma prior: $p(w_{ji}) = \Gamma(w_{ji} | o_{ji}, k)$, where k can be a shape parameter. To perform inference on the MRF, the first autonomous vehicle 602 can estimate values of the absolute poses $\xi_i$, the scale parameters $\Sigma_i$, and the weights $w_{ji}$ that maximize the product of the pairwise potentials. This can be done using iterated conditional modes described by the algorithm:

1: $\xi_i \leftarrow \xi_i$ i=1 . . . n
2: $w_{ji} \leftarrow 1$ (i, j)∈E
3: for k=1 . . . num_iters do
4:

$$\xi_i, \Sigma_i \leftarrow \operatorname{argmax}_{\xi_i, \Sigma_i} \prod_{j \in adj(i)} p\left(\hat{\xi}_{ji} \circ \xi_j\right)^{w_{ji}} p\left(\hat{\xi}_{ij}^{-1} \circ \xi_j\right)^{w_{ij}} i = 1 \ldots n$$

5: $w_{ji} \leftarrow \operatorname{argmax}_{w_{ji}} p(w_{ji} | \xi_i, \Sigma_i)$ (i, j)∈E
6: end for
7: return $\xi_i$ i=1 . . . n The maximization step on line 4 can happen simultaneously for all nodes via weighted expectation maximization (EM) for the t distribution. The maximization step on Line 5 can be computed using the closed form:

$$\underset{w_{ji}}{\operatorname{argmax}}\ p\left(w_{ji} | \xi_i, \sum\nolimits_i\right) = \frac{o_{ji} k}{k - \log p\left(\hat{\xi}_{ji} \circ \xi_j\right) - \log p\left(\hat{\xi}_{ji}^{-1} \circ \xi_i\right)}.$$

The absolute poses 642, 644 can be used to update the relative transformations needed to warp the messages.

The first autonomous vehicle 602 (e.g., its onboard vehicle computing system) can generate an updated intermediate environmental representation 660 based, at least in part, on the first intermediate environmental representation 610, the second intermediate environmental representation 612, and/or the third intermediate environmental representation 614. In addition, or alternatively, the updated intermediate environmental representation 660 can be generated based, at least in part, on the first, second, and/or third relative poses 622, 624, 626. In some implementations, the updated intermediate environmental representation 660 can be generated based, at least in part, on the first, second, and/or third absolute poses 642, 644.

The updated intermediate environmental representation 660 can be generated using a machine-learned aggregation model 320B (e.g., one or more portions of the machine-learned detection and prediction model, machine-learned model 320B, etc.). For example, the machine-learned aggregation model 320B used to create the updated intermediate environmental representation 660 can include a neural network (and/or one or more layers thereof). The machine-learned aggregation model 320B can be configured to aggregate a plurality of intermediate environmental representations 610, 612, 614 from a plurality of autonomous vehicles 602, 604, 606. For instance, the first autonomous vehicle 602 can determine an updated intermediate environmental representation 660 based at least in part on the first intermediate environmental representation 610, the second intermediate environmental representation 612 generated by the first transmitter autonomous vehicle 604, and/or the third intermediate environmental representation 614 generated by the second transmitter autonomous vehicle 606. By way of example, the first autonomous vehicle 602 (e.g., its onboard vehicle computing system) can input the first intermediate environmental representation 610, the second intermediate environmental representation 612, and/or the third intermediate environmental representation 614 into the machine-learned aggregation model 320B. The machine-learned aggregation model 320B can be configured to aggregate the intermediate environmental representation(s) 610, 612, 614 to create the updated intermediate environmental representation 660. The first autonomous vehicle 602 can obtain the updated intermediate environmental representation 660 as an output of the machine-learned aggregation model 320B.

The machine-learned aggregation model 320B can include a graph neural network that includes a plurality of nodes. Each node of the graph neural network can correspond to a respective autonomous vehicle (e.g., first 602, second 604, third 606, etc. autonomous vehicle) of a plurality of autonomous vehicles within the environment of the first autonomous vehicle 602. This can include, for example, vehicles within the communication range of the first autonomous vehicle 602. Each node can represent a respective set of spatial coordinates (e.g., an estimated, relative 622, 624, 626, or absolute pose 642, 644) of a respective autonomous vehicle.

The first autonomous vehicle 602 can be configured to transform inputted intermediate environmental representation(s) 610, 612, 614 based, at least in part, on a set of spatial coordinates associated with the transmitter autonomous vehicles. For instance, the machine-learned aggregation model 320B can be configured to initialize a node state of at least one node of the graph neural network and update the node state of the at least one node based at least in part on a spatial transformation. For instance, in the graph neural network, each node can maintain a state representation. At each iteration, messages can be sent between nodes of the graph and the node states for each node can be updated based, at least in part, on the aggregated received information (e.g., of the messages) using a neural network. Graphs for different vehicles can be different, as each vehicle can receive communications from one or more different vehicles (the set of vehicles within one vehicle's communication range may be different than the vehicles within another vehicle's communication range).

In some implementations, the first autonomous vehicle 602 can generate a second transformed intermediate environmental representation 652 by transforming the second intermediate environmental representation 612 based, at least in part, on the absolute pose 642 of the second autonomous vehicle 604. For example, the machine-learned aggregation model 320B can generate a second transformed intermediate environmental representation 652 by transforming the second intermediate environmental representation 612 based, at least in part, on the one or more second updated spatial coordinates and/or the second updated orientation for the second autonomous vehicle 604. In addition, or alternatively, the first autonomous vehicle 602 can generate a third transformed intermediate environmental representation 654 by transforming the third intermediate environmental representation 614 based, at least in part, on the absolute pose 644 of the third autonomous vehicle 606. For example, the machine-learned aggregation model 320B can generate the third transformed intermediate environmental representation 654 by transforming the third intermediate environmental representation 614 based, at least in part, on the one or more third updated spatial coordinates and/or the third updated orientation for the third autonomous vehicle 606. By way of example, each vehicle node of the neural network can represent the updated spatial coordinates and/or orientation of each respective autonomous vehicle.

The first autonomous vehicle 602 (e.g., the machine-learned aggregation model 320B) can perform message passing to share features between the vehicle nodes. At iteration 1, for vehicle node i sending a message $$m_{i\to k}^{(l)}$$

to vehicle node k, the first autonomous vehicle 602 can apply a relative spatial transformation $\xi_i \to k$ to warp the state at node i to the feature space of node k:

$$m_{i\to k}^{(l)} = T\left(h_i^{(l)}, \xi_{i\to k}\right) \cdot M_{i\to k}$$

where T applies the spatial transformation and resampling of the feature state via bilinear-interpolation, and $M_{i\to k}$ masks out out-of-bound regions after warping. This can be helpful because portions of the transmitter autonomous vehicle features may be further away than the first autonomous vehicle's 602 current range.

The first autonomous vehicle 602 can aggregate the received messages (e.g., to generate aggregated messages 656) at node i via an aggregation function φ (e.g., sum, mean, pooling) and update the node state with a ConvGRU:

$$h_i^{(l+1)} = ConvGRU\left(h_i^{(l)}, \phi\left(\left[\forall_{j\in N(i)}, m_{j\to i}^{(m)}\right]\right)\right)$$

where j∈N(i) are the neighboring nodes in the network for node i and φ is the mean operator. After the final iteration, a multilayer perceptron can output the updated intermediate environmental representation:

$$z_j^{(L)} = MLP\left(h_j^{(L)}\right)$$

In some implementations, the second portion of the machine-learned detection and prediction model (e.g., the machine-learned aggregation model 620B) can include a machine-learned attention model configured to weigh a plurality of intermediate environmental representations before generating the updated intermediate environmental representation 660. For example, the machine-learned attention model can determine a first weight for the second intermediate environmental representation 612 and/or a second weight for the third intermediate environmental representation 614. Each weight can be indicative of a predicted accuracy of an estimated pose. For example, the first weight can be indicative of a first predicted accuracy of the second estimated pose and/or the second weight can be indicative of a second predicted accuracy of the third estimated pose. The first autonomous vehicle 602 (e.g., machine-learned aggregation model 320B) can assign the second weight to the second transformed intermediate environmental representation 652 and/or the third weight to the third transformed intermediate environmental representation 654. The updated intermediate environmental representation 660 can be generated, via the machine-learned aggregation model 320B (e.g., a second portion of the machine-learned detection and prediction model), based, at least in part, on the first and second weights.

More particularly, after the predicted relative transformations 652, 654 are generated, there may still be errors present in some messages that hinder the first autonomous vehicle's 602 performance. To mitigate such errors, the machine-learned aggregation model 320B (e.g., via the attention model) can prioritize messages (e.g., intermediate environmental representations) to focus on clean messages and ignore noisy ones. To do so, a weight can be assigned to each transformed intermediate environmental representation 652, 654 before the representations are averaged (e.g., to receive the weighted average representation 656), to suppress the remaining noisy representations. The machine-learned aggregation model 320B can use a convolutional neural network A to predict an unnormalized weight $s_{ji} \in \mathbb{R}$. For example, sigmoid $(A(m_i \| m_{ji})) = s_{ji}$. The normalized weight $a_{ji} \in \mathbb{R}$ can be computed by:

$$a_{ji} = \frac{s_{ji}}{\alpha + \sum_{k\in agj(i)} s_{ki}}.$$

The learned parameter $\sigma \in \mathbb{R}$ can allow the model to ignore all incoming messages if needed. In this manner, if all the incoming messages are noisy, the resulting weights can be large after the normalization. The updated intermediate environmental representation 660 can be computed by:

$$h_i = G(\{a_{ji} m_{ji}\}_{j \in adj(i)})$$

The first autonomous vehicle 602 can generate an autonomy output 334 for the first autonomous vehicle 602 based at least in part on the updated intermediate environmental representation 660. The autonomy output 334 can be indicative of a bounding shape associated with an object within the environment of the recipient autonomous vehicle 602 and one or more predicted future locations of the object. For example, the autonomy output 334 can include one or more bounding boxes indicative of one or more objects within the surrounding environment of the first autonomous vehicle 602. In some implementations, to generate the autonomy output 334, the first autonomous vehicle 602 can utilize the machine-learned detection and prediction model 332 (and/or a second portion of the model). The machine-learned detection and prediction model 332 can be configured to generate the autonomy output(s) 334. The joint detection and prediction model 332 can include several memories and networks. For example, the joint detection and prediction model 332 can include a plurality of network branches (e.g., a branch for detection, a branch for prediction, etc.), a plurality of memories (e.g., an appearance memory, object path memory, etc.) as well as an object path proposal network and a path refinement network.

For example, the first autonomous vehicle 602 can input the updated intermediate environmental representation 660 into the machine-learned detection and prediction model 332 and obtain the autonomy output 334 as an output of the machine-learned detection and prediction model 332. For instance, the first autonomous vehicle 602 can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates, respectively. The output of the detection branch can be parameterized as (x, y, w, h, θ), which denotes the position, size, and orientation of objects. This can be represented as a bounding shape associated with an object within the environment of the first autonomous vehicle 602. The output of the prediction branch can be parameterized as ($x_t$, $y_t$), which denotes the object's location at future time step t. This can indicate one or more future location(s) of the object. The autonomy output 334 can be indicative of the output of the detection branch and the prediction branch (e.g., a bounding shape and predicted future location(s)).

More particularly, returning to FIG. 3, the recipient system 304 (e.g., vehicle computing system of autonomous vehicle 602) can generate (e.g., using a machine-learned detection and prediction model 332) an autonomy output 334 for the recipient system 304 (e.g., the first autonomous vehicle 202, 602, etc.) based at least in part on the updated intermediate environmental representation 322. The autonomy output 334 can be indicative of an object 212 within the environment of the recipient system 304 (e.g., second autonomous vehicle 204) and one or more predicted future locations 216 (e.g., shown in FIG. 2) of the object 212. The autonomy output 334 can be indicative of a bounding shape 218 (e.g., shown in FIG. 2) associated with an object 212 within the environment of the recipient system 304 (e.g., the second autonomous vehicle 204). The one or more predicted future locations 216 of the object 212 can include one or more waypoints (at one or more future times) and can be expressed as a predicted motion trajectory of the object 212. In some implementations, the object 212 can be occluded from a field of view of one or more sensors of the recipient system 304 (e.g., the second autonomous vehicle 204).

To generate the autonomy output, the recipient system 304 (e.g., the second autonomous vehicle 204) can utilize a machine-learned detection and prediction model 332. The machine-learned detection and prediction model 332 can be configured to generate the autonomy output(s) 334. The recipient system 304 (e.g., first autonomous vehicle 202, 602) can input the updated intermediate environmental representation 322 into the machine-learned detection and prediction model 332. The recipient system 304 (e.g., first autonomous vehicle 202, 602, etc.) can obtain the autonomy output 334 as an output of the machine-learned detection and prediction model 332. For instance, the recipient system 304 (e.g., first autonomous vehicle 202, 602, etc.) can apply a set of four convolutional blocks to extract a high-level representation suitable for a perception and prediction task. The block helps to capture multi-scale context efficiently, which can be helpful for the prediction function. A feature map can be used with two network branches that output detection and motion forecasting estimates, respectively. The output of the detection branch can be parameterized as (x, y, w, h, θ), which denotes the position, size, and orientation of objects. This can be represented as a bounding shape 218 (e.g., shown in FIG. 2) associated with an object 212 within the environment of the recipient system 304 (e.g., first autonomous vehicle 202, 602, etc.). The output of the prediction branch can be parameterized as ($x_t$, $y_t$), which denotes the object's location at future time step t. This can indicate one or more future location(s) 216 of the object 212. The autonomy output 334 can be indicative of the output of the detection branch and the prediction branch (e.g., a bounding shape and predicted future location(s)). The machine-learned detection and prediction model 332 can be used by or included in the joint perception/prediction system 123 of the vehicle computing system 112.

Turning back to FIG. 6, the first autonomous vehicle 602 (e.g., its onboard vehicle computing system) can generate a motion plan for the first autonomous vehicle 602 based at least in part on the autonomy output 334. For example, the first autonomous vehicle 602 can include a motion planning system (e.g., motion planning system 170C of FIG. 1). The motion planning system can determine a motion plan and generate motion plan data for the first autonomous vehicle 602 based at least in part on the autonomy output 334. The motion plan can be generated based at least in part on the autonomy output 334 in that it can consider an object (and/or its future location(s)) described in the autonomy output 334 when planning the motion of the first autonomous vehicle 602, whether that is overridden by other factors (e.g., other objects, unexpected occurrences, etc.) or eventually effects the actual motion of the vehicle. The motion plan data can include vehicle actions, trajectories, waypoints, etc. with respect to the objects proximate to the first autonomous vehicle 602 as well as the predicted movements. For example, the motion planning system can include one or more machine-learned models/optimization algorithms that consider cost data associated with a vehicle action as well as other objective functions (e.g., cost functions based, at least in part, on speed limits, traffic lights, and/or other aspects of the environment), if any, to determine optimized variables that make up the motion plan data. By way of example, the motion planning system can determine that the vehicle can perform a certain action (e.g., stop for an object) without increasing the potential risk to the vehicle and/or violating any traffic laws (e.g., speed limits, lane boundaries, signage, etc.). The motion plan data can include a planned trajectory, velocity, acceleration, and/or other actions.

The first autonomous vehicle 602 (e.g., its onboard vehicle computing system) can initiate a motion control of the first autonomous vehicle 602 based at least in part on the motion plan. A motion control can include an action to implement, change, continue, and/or otherwise affect the motion of the first autonomous vehicle 602. The motion planning system can provide the motion plan data indicative of the vehicle actions, a planned trajectory, and/or other operating parameters to the vehicle control systems to implement the motion plan data for the vehicle. For instance, the vehicle 602 can include a vehicle interface configured to translate the motion plan data into instructions. By way of example, the vehicle interface can translate motion plan data into instructions for controlling the first vehicle including adjusting the steering of the vehicle "X" degrees and/or applying a certain magnitude of braking force to avoid interfering with an object indicated in the autonomy output. The vehicle interface can send one or more control signals to the responsible vehicle control component (e.g., braking control system, steering control system, and/or acceleration control system) to execute the instructions and implement the motion plan data. In this way, the first vehicle 602 can account for and control its motion with respect to object(s) outside of the normal field of view of the first vehicle 602 but within the field of view of the transmitter autonomous vehicle(s) 604, 606.

The machine-learned model(s) 620, 320B, 332, etc. of the described system can be trained in several stages. For instance, a sensor backbone (e.g., LIDAR backbone for helping to create the intermediate environmental representations 610, 612, 614) and output headers can be pre-trained on a real-LIDAR single-vehicle dataset, bypassing the cross-vehicle aggregation stage. The loss function can be cross-entropy on a vehicle classification output and smooth l1 on the bounding box parameters. Hard-negative mining can be applied as well to improve performance. The sensor backbone (e.g., LIDAR backbone), cross-vehicle aggregation, and output header models can be jointly fine-tuned on a simulated vehicle-to-vehicle dataset (described below) with synchronized inputs (e.g., no time delay) using the same loss function. The training can avoid the use of a temporal warping function at this stage. During training, for every example in the minibatch, the number of connected vehicles can be randomly sampled uniformly on [0, min(c, 6)], where c is the number of candidate vehicles available. This can help ensure that the architecture of the machine-learned model(s) can handle arbitrary graph connectivity while also making sure the fraction of vehicles in the scene/ecosystem on the network remains reasonable.

In some implementations, the machine-learned detection and prediction model 320B and machine-learned attention model can be trained together. For example, identifying noisy examples can be treated as a supervised binary classification task, where clean examples can be assigned a high value and noisy examples can be assigned a low value. For the data and labels, strong noise can be generated and applied to some vehicles and weak pose noise to others within one scene. The noise can be generated via $n_i \sim D_w$ or $n_i \sim D_s$, where $D_w$ is a distribution of weak pose noises, and $D_s$ is strong noises. The noise can have two translational components and a rotational component, thus $n_i \in \mathbb{R}^3$. A fixed proportion p of autonomous vehicles can receive noise from the strong distribution while the rest can receive noise from the weak distribution. When considering an intermediate environmental representation, the representation is considered clean when both autonomous vehicles have noise from the weak distribution and considered noisy when either vehicle has noise from the strong distribution. As an example, the labeling can include:

$$\text{label}(j, i) = \begin{cases} \gamma & n_j \sim \mathcal{D}_w \text{ and } n_i \sim \mathcal{D}_w, \\ 1-\gamma & n_j \sim \mathcal{D}_s \text{ or } n_i \sim \mathcal{D}_s. \end{cases}$$

The function can produce smooth labels to temper the attention model's predictions so that the attention weights are not just 0 or 1. The loss for the joint training task can be defined as follows:

$$\mathcal{L}_{joint}\left(y_i, \hat{y}_i, \{s_{ji}\}_{j \in adj(i)}\right) = \lambda_{PnP} L_{PnP}(y_i, \hat{y}_i,) + \frac{\lambda_{attn}}{|adj(i)|} \sum_{j \in adj(i)} \mathcal{L}_{CE}(\text{label}(j, i), s_{ji}).$$

where $L_{CE}$ can be a binary cross entropy loss.

In addition, or alternatively, the machine-learned detection and prediction model 320B and the machine-learned attention model can be frozen and only the regression model 620 can be trained using $L_c$. In this stage, all autonomous vehicle(s) can be assigned noise from the strong noise distribution $D_s$. The machine-learned regression model 620 can be trained using a loss which is a sum of losses over each coordinate:

$$\mathcal{L}_C\left(\xi_{ji}, \hat{\xi}_{ji}\right) = \sum_{k=1}^{3} \lambda_k \mathcal{L}_{sl1}\left(\xi_{ji}, \hat{\xi}_{ji}\right) k,$$

with $\lambda=[\lambda_{pos}, \lambda_{pos}, \lambda_{rot}]$. $L_{sl1}$ can be the smooth $l_1$ loss.

The machine-learned detection and prediction model 320B and the machine-learned regression model 620 can be trained end-to-end via backpropagation. For example, the entire network can be fine-tuned end-to-end with the combined loss: $L=L_c+L_{joint}$. This can be possible because the MRF inference algorithm can be differentiable via backpropagation.

The simulated vehicle-to-vehicle dataset (used for training) can be created using a sensor simulation system. The sensor simulation system can use a large catalog of 3D static scenes and dynamic objects that are built upon real-world data collections to provide a set of rich and diverse assets from which to simulate new scenarios. The sensor simulation system can apply ray casting and machine learning to generate a realistic sensor point cloud such as, for example, a LIDAR point cloud. The sensor simulation system can allow for the creation of vehicle-to-vehicle scenes where a percentage of the vehicles are autonomous vehicles and generate realistic sensor data (e.g., LIDAR data) at different vehicle locations.

The simulations can be based, at least in part, on snippets (e.g., 25-second snippets, etc.) of labeled data recorded by an autonomous vehicle in the real world, which contains temporal tracks of the bounding boxes of all agents in the scene with respect to the recording vehicle. To generate the simulated vehicle-to-vehicle dataset, a real-world snippet can be recreated in a simulated virtual world using these ground-truth tracks. By using the same scenario layouts and agent trajectories recorded from the real world, the simulation system can replicate realistic traffic and vehicle motion for vehicle-to-vehicle dataset generation. At each timestep, actor 3D-assets can be placed into the virtual scene according to real-world labels and generate the sensor data (e.g., LIDAR point cloud data, etc.) at different candidate vehicle locations. Candidate autonomous vehicles can be non-parked vehicles that are within a communication range (e.g., a 50-meter broadcast range) of a subject vehicle in the scene (e.g., the autonomous vehicle that recorded the snippet in the real-world). This data generation approach allows for the generation of more realistic and diverse topologies of vehicle-to-vehicle communication networks.

It should be understood that each autonomous vehicle within the ecosystem (e.g., within a communication range) can perform the functions of transmitter autonomous vehicles 604, 606 and the functions of recipient autonomous vehicle 602 as described above. As such, an autonomous vehicle can not only communicate an intermediate environmental representation to other autonomous vehicles but can also receive intermediate environmental representations from other autonomous vehicles. In some implementations, the autonomous vehicle(s) can also, or alternatively, send and receive autonomy outputs (e.g., of the joint detection/prediction model) and/or sensor data among one another.

FIG. 7 depicts a flow diagram of method 700 for correcting pose errors according to example embodiments of the present disclosure. One or more portion(s) of the method 700 can be implemented by a computing system that includes one or more computing devices such as, for example, the computing systems described with reference to the other figures (e.g., vehicle computing system 110, operations computing system 190A, remote computing system(s) 190B, recipient system 304, transmitter system 302, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3, 5-6, 8-9, etc.), for example, to correct pose errors. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At (702), the method 700 includes obtaining, via the one or more sensors, sensor data associated with a surrounding environment of an autonomous vehicle. For example, a computing system (e.g., vehicle computing system 110, operations computing system 190A, remote computing system(s) 190B, computing system 690, recipient system 304, etc.) can obtain, via the one or more sensors, sensor data associated with the surrounding environment of the autonomous vehicle.

At (704), the method 700 includes obtaining first estimated location data indicative of a first estimated pose of the autonomous vehicle. For example, the computing system (e.g., vehicle computing system 110, operations computing system 190A, remote computing system(s) 190B, computing system 690, recipient system 304, etc.) can obtain the first estimated location data indicative of the first estimated pose of the autonomous vehicle.

At (706), the method 700 includes determining a first intermediate environmental representation of at least a first portion of the surrounding environment of the autonomous vehicle based, at least in part, on the sensor data. For example, the computing system (e.g., vehicle computing system 110, operations computing system 190A, remote computing system(s) 190B, computing system 690, recipient system 304, etc.) can determine the first intermediate environmental representation of at least a first portion of the surrounding environment of the autonomous vehicle based, at least in part, on the sensor data.

At (708), the method 700 includes obtaining a first message from a second autonomous vehicle. For example, the computing system (e.g., vehicle computing system 110, operations computing system 190A, remote computing system(s) 190B, computing system 690, recipient system 304, etc.) can obtain the first message from the second autonomous vehicle. The first message can include a second intermediate environmental representation of at least a second portion of the surrounding environment of the first autonomous vehicle and second estimated location data indicative of a second estimated pose of the second autonomous vehicle.

At (710), the method 700 includes obtaining a second message from a third autonomous vehicle. For example, the computing system (e.g., vehicle computing system 110, operations computing system 190A, remote computing system(s) 190B, computing system 690, recipient system 304, etc.) can obtain the second message from the third autonomous vehicle. The second message can include a third intermediate environmental representation of at least a third portion of the surrounding environment of the autonomous vehicle and third estimated location data indicative of a third estimated pose of the third autonomous vehicle.

At (712), the method 700 includes determining a first relative pose between the autonomous vehicle and the second autonomous vehicle based, at least in part, on the first intermediate environmental representation and the second intermediate environmental representation, a second relative pose between the autonomous vehicle and the third autonomous vehicle based, at least in part, on the first intermediate environmental representation and the third environmental representation, and a third relative pose between the second autonomous vehicle and the third autonomous vehicle based, at least in part, on the second intermediate environmental representation and the third environmental representation. For example, the computing system (e.g., vehicle computing system 110, operations computing system 190A, remote computing system(s) 190B, computing system 690, recipient system 304, etc.) can determine the first relative pose between the autonomous vehicle and the second autonomous vehicle based, at least in part, on the first intermediate environmental representation and the second intermediate environmental representation, the second relative pose between the autonomous vehicle and the third autonomous vehicle based, at least in part, on the first intermediate environmental representation and the third environmental representation, and the third relative pose between the second autonomous vehicle and the third autonomous vehicle based, at least in part, on the second intermediate environmental representation and the third environmental representation.

At (714), the method 700 includes determining at least one of a first absolute pose for the autonomous vehicle, a second absolute pose for the second autonomous vehicle, or a third absolute pose for the third autonomous vehicle based, at least in part, on the first relative pose, the second relative pose, and the third relative pose. For example, the computing system (e.g., vehicle computing system 110, operations computing system 190A, remote computing system(s) 190B, computing system 690, recipient system 304, etc.) can determine at least one of the first absolute pose for the autonomous vehicle, the second absolute pose for the second autonomous vehicle, or the third absolute pose for the third autonomous vehicle based, at least in part, on the first relative pose, the second relative pose, and the third relative pose.

At (716), the method 700 includes generating an updated intermediate environmental representation based, at least in part, on the first intermediate environmental representation, the second intermediate environmental representation, the third intermediate environmental representation, and the at least one of the first absolute pose, the second absolute pose, or the third absolute pose. For example, the computing system (e.g., vehicle computing system 110, operations computing system 190A, remote computing system(s) 190B, computing system 690, recipient system 304, etc.) can generate the updated intermediate environmental representation based, at least in part, on the first intermediate environmental representation, the second intermediate environmental representation, the third intermediate environmental representation, and the at least one of the first absolute pose, the second absolute pose, or the third absolute pose.

At (718), the method 700 includes generating an autonomy output for the autonomous vehicle based, at least in part, on the updated intermediate environmental representation. For example, the computing system (e.g., vehicle computing system 110, operations computing system 190A, remote computing system(s) 190B, computing system 690, recipient system 304, etc.) can generate the autonomy output for the autonomous vehicle based, at least in part, on the updated intermediate environmental representation.

Figure 8:
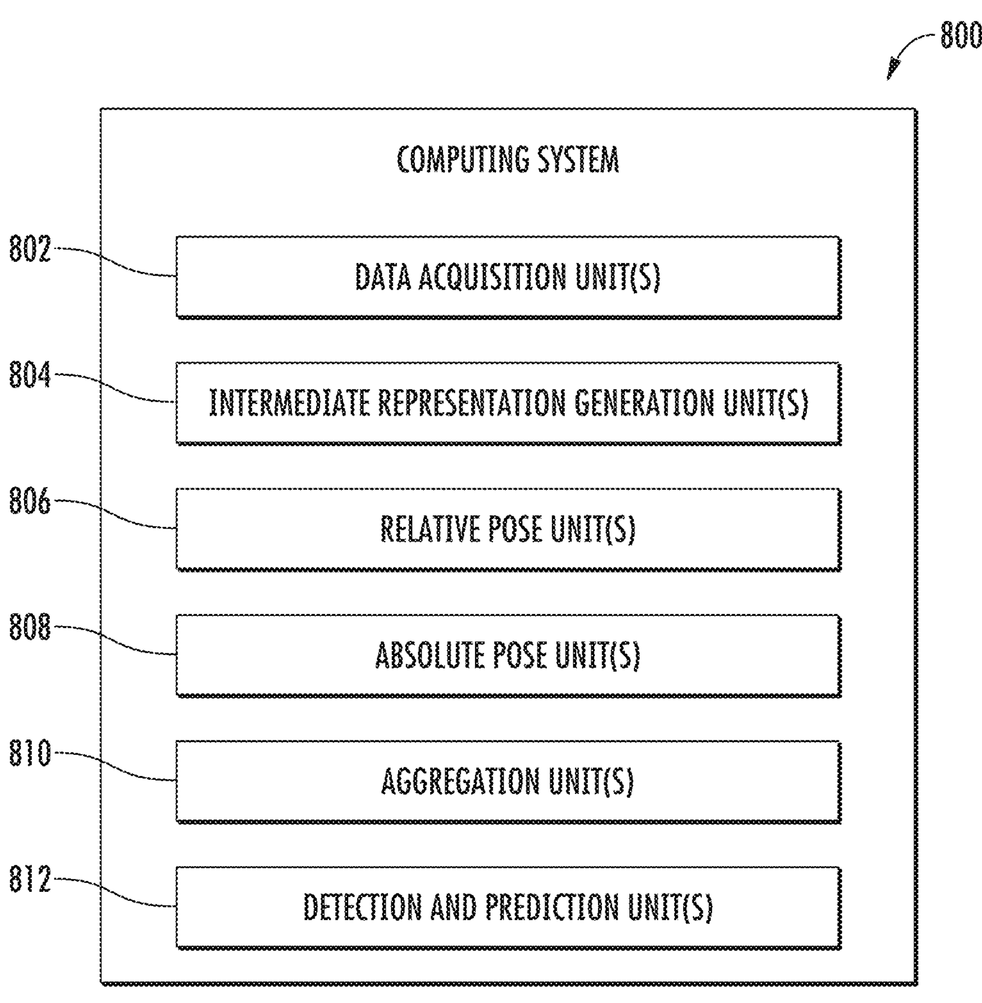
FIG. 8 depicts an example system with various means for performing operations and functions according example implementations of the present disclosure.

FIG. 8 depicts an example system 800 with various means for performing operations and functions according example implementations of the present disclosure. Various means can be configured to perform the methods and processes described herein. For example, a computing system can include data acquisition unit(s) 802, intermediate representation generation unit(s) 804, relative pose unit(s) 806, absolute pose unit(s) 808, aggregation unit(s) 810, detection and prediction unit(s) 812, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device (s), data registrar(s), database(s), and/or other suitable hardware.

The means can be programmed to perform one or more algorithm(s) for carrying out the operations and functions described herein. For instance, the means (e.g., data acquisition unit(s) 802, etc.) can be configured to obtain, via one or more sensors, sensor data associated with a surrounding environment of the autonomous vehicle. The means (e.g., data acquisition unit(s) 802, etc.) can be configured to obtain a first estimated location data indicative of a first estimated pose of the autonomous vehicle. The means (e.g., data acquisition unit(s) 802, etc.) can be configured to obtain a first message from a second autonomous vehicle. The first message can include a second intermediate environmental representation of at least a second portion of the surrounding environment of the first autonomous vehicle and second estimated location data indicative of a second estimated pose of the second autonomous vehicle. The means (e.g., data acquisition unit(s) 802, etc.) can be configured to obtain a second message from a third autonomous vehicle. The second message can include a third intermediate environmental representation of at least a third portion of the surrounding environment of the autonomous vehicle and third estimated location data indicative of a third estimated pose of the third autonomous vehicle.

The means (e.g., intermediate representation generation unit(s) 804, etc.) can be configured to determine a first intermediate environmental representation of at least a first portion of the surrounding environment of the autonomous vehicle based, at least in part, on the sensor data. The means (e.g., relative pose unit(s) 806, etc.) can be configured to determine a first relative pose between the autonomous vehicle and the second autonomous vehicle based, at least in part, on the first intermediate environmental representation and the second intermediate environmental representation, a second relative pose between the autonomous vehicle and the third autonomous vehicle based, at least in part, on the first intermediate environmental representation and the third environmental representation, and a third relative pose between the second autonomous vehicle and the third autonomous vehicle based, at least in part, on the second intermediate environmental representation and the third environmental representation.

The means (e.g., absolute pose unit(s) 808, etc.) can be configured to determine at least one of a first absolute pose for the autonomous vehicle, a second absolute pose for the second autonomous vehicle, or a third absolute pose for the third autonomous vehicle based, at least in part, on the first relative pose, the second relative pose, and/or the third relative pose. The means (e.g., aggregation unit(s) 810, etc.) can be configured to generate an updated intermediate environmental representation based, at least in part, on the first intermediate environmental representation, the second intermediate environmental representation, the third intermediate environmental representation, and the at least one of the first absolute pose, the second absolute pose, and/or the third absolute pose. The means (e.g., detection and prediction unit(s) 812, etc.) can be configured to generate an autonomy output for the autonomous vehicle based, at least in part, on the updated intermediate environmental representation.

Figure 9:
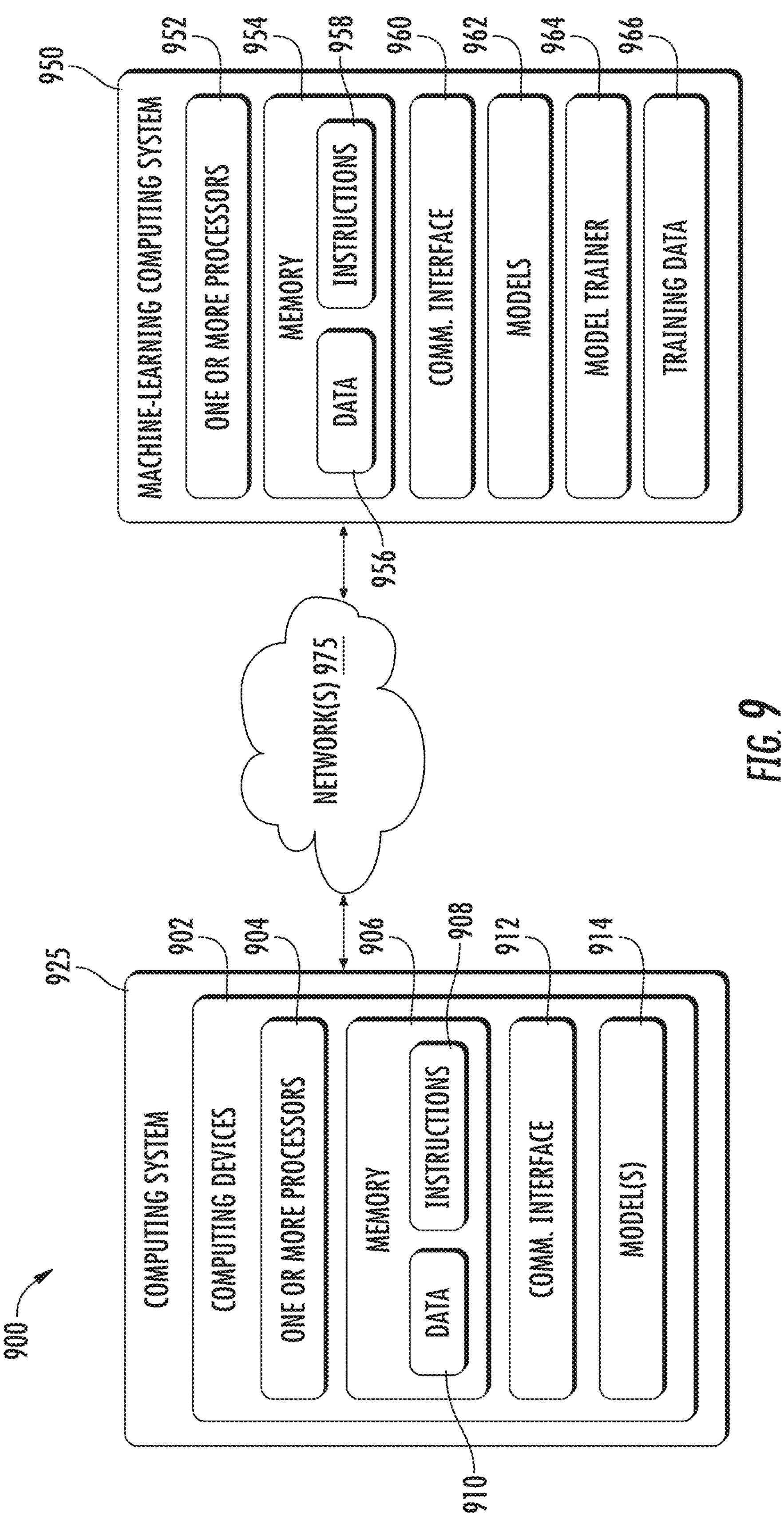
FIG. 9 depicts an example computing system according to example embodiments of the present disclosure.

FIG. 9 depicts an example computing system 900 according to example embodiments of the present disclosure. The example system 900 can include the computing system 925 and a machine learning computing system 950 that are communicatively coupled over one or more network(s) 975. As described herein, the computing system 925 can be implemented onboard a transmitter and/or recipient system such as that of a vehicle (e.g., as a portion of the vehicle computing system) and/or can be remote therefrom (e.g., as portion of an operations computing system). In either case, a vehicle computing system can utilize the operations and model(s) of the computing system 925 (e.g., locally, via wireless network communication, etc.).

The computing system 925 can include one or more computing device(s) 902. The computing device(s) 902 of the computing system 925 can include processor(s) 904 and a memory 906. The one or more processors 904 can be any suitable processing device (e.g., a processor core, a microprocessor, an ASIC, a FPGA, a controller, a microcontroller, etc.) and can be one processor or a plurality of processors that are operatively connected. The memory 906 can include one or more non-transitory computer-readable storage media, such as RAM, ROM, EEPROM, EPROM, one or more memory devices, flash memory devices, etc., and combinations thereof.

The memory 906 can store information that can be obtained by the one or more processors 904. For instance, the memory 906 (e.g., one or more non-transitory computer-readable storage mediums, memory devices) can include computer-readable instructions 908 that can be executed by the one or more processors 904. The instructions 908 can be software written in any suitable programming language or can be implemented in hardware. Additionally, or alternatively, the instructions 908 can be executed in logically and/or virtually separate threads on processor(s) 904.

For example, the memory 906 can store instructions 908 that when executed by the one or more processors 904 cause the one or more processors 904 (the computing system 925) to perform operations such as any of the operations and functions of a vehicle computing system, transmitter computing system, recipient computing system, target computing system, adverse computing system, and/or for which any of these computing systems are configured such as, for example, to determine, apply, and/or correct pose errors with intermediate environmental representations, as described herein.

The memory 906 can store data 910 that can be obtained (e.g., received, accessed, written, manipulated, generated, created, stored, etc.). The data 910 can include, for instance, sensor data, intermediate environmental representations, location data, relative poses, absolute poses, autonomy outputs, perception data, prediction data, motion planning data, control signals, models, and/or any other data/information described herein. In some implementations, the computing device(s) 902 can obtain data from one or more memories that are remote from the computing system 900.

The computing device(s) 902 can also include a communication interface 912 used to communicate with one or more other system(s) (e.g., other systems onboard and/or remote from a vehicle, the other systems of FIG. 9, etc.). The communication interface 912 can include any circuits, components, software, etc. for communicating via one or more networks 975. In some implementations, the communication interface 912 can include, for example, one or more of a communications controller, receiver, transceiver, transmitter, port, conductors, software and/or hardware for communicating data/information.

According to an aspect of the present disclosure, the computing system 925 can store or include one or more machine-learned models 914. As examples, the machine-learned models 914 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks. The machine-learned models 914 can include the machine-learned models of FIGS. 3, 6, and 7 and/or other model(s), as described herein.

In some implementations, the computing system 925 can receive the one or more machine-learned models 914 from the machine learning computing system 950 over the network(s) 975 and can store the one or more machine-learned models 914 in the memory 906 of the computing system 925. The computing system 925 can use or otherwise implement the one or more machine-learned models 914 (e.g., by processor(s) 904). In particular, the computing system 925 can implement the machine learned model(s) 914 to generate modified intermediate environmental representation(s), autonomy output(s), etc.

The machine learning computing system 950 can include one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage media, such as RAM, ROM, EEPROM, EPROM, one or more memory devices, flash memory devices, etc., and combinations thereof.

The memory 954 can store information that can be accessed by the one or more processors 952. For instance, the memory 954 (e.g., one or more non-transitory computer-readable storage mediums, memory devices) can store data 956 that can be obtained (e.g., generated, retrieved, received, accessed, written, manipulated, created, stored, etc.). In some implementations, the machine learning computing system 950 can obtain data from one or more memories that are remote from the machine learning computing system 950.

The memory 954 can also store computer-readable instructions 958 that can be executed by the one or more processors 952. The instructions 958 can be software written in any suitable programming language or can be implemented in hardware. Additionally, or alternatively, the instructions 958 can be executed in logically and/or virtually separate threads on processor(s) 952. The memory 954 can store the instructions 958 that when executed by the one or more processors 952 cause the one or more processors 952 to perform operations. The machine learning computing system 950 can include a communication interface 960, including devices and/or functions similar to that described with respect to the computing system 925.

In some implementations, the machine learning computing system 950 can include one or more server computing devices. If the machine learning computing system 950 includes multiple server computing devices, such server computing devices can operate according to various computing architectures, including, for example, sequential computing architectures, parallel computing architectures, or some combination thereof.

In addition, or alternatively to the model(s) 914 at the computing system 925, the machine learning computing system 950 can include one or more machine-learned models 962. As examples, the machine-learned models 962 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 962 can be similar to and/or the same as the machine-learned models 914, and/or other model(s) described herein.

As an example, the machine learning computing system 950 can communicate with the computing system 925 according to a client-server relationship. For example, the machine learning computing system 950 can implement the machine-learned models 962 to provide a web service to the computing system 925 (e.g., including on a vehicle, implemented as a system remote from the vehicle, etc.). For example, the web service can provide machine-learned models to an entity associated with a vehicle; such that the entity can implement the machine-learned model. Thus, machine-learned models 962 can be located and used at the computing system 925 (e.g., on the vehicle, at the operations computing system, etc.) and/or the machine-learned models 962 can be located and used at the machine learning computing system 950.

In some implementations, the machine learning computing system 950 and/or the computing system 925 can train the machine-learned models 914 and/or 962 through use of a model trainer 964. The model trainer 964 can train the machine-learned models 914 and/or 962 using one or more training or learning algorithms. One example training technique is backwards propagation of errors. In some implementations, the model trainer 964 can perform supervised training techniques using a set of labeled training data. In other implementations, the model trainer 964 can perform unsupervised training techniques using a set of unlabeled training data. The model trainer 964 can perform a number of generalization techniques to improve the generalization capability of the models being trained. Generalization techniques include weight decays, dropouts, or other techniques.

The machine-learned model(s) 914/962 of the described system can be trained in several stages. For instance, a sensor backbone (e.g., LIDAR backbone for helping to create the intermediate environmental representation) and output headers can be pre-trained on a real-LiDAR single-vehicle dataset, bypassing the cross-vehicle aggregation stage. The loss function can be cross-entropy on a vehicle classification output and smooth l1 on the bounding box parameters. Hard-negative mining can be applied as well to improve performance. The sensor backbone (e.g., LIDAR backbone), cross-vehicle aggregation, and output header models can be jointly fine-tuned on a simulated vehicle-to-vehicle dataset with synchronized inputs (e.g., no time delay) using the same loss function. The training can avoid the use of a temporal warping function at this stage. During training, for every example in the minibatch, the number of connected vehicles can be randomly sampled uniformly on [0, min(c, 6)], where c is the number of candidate systems/vehicles available. This can help ensure that the architecture of the machine-learned model(s) 914/962 can handle arbitrary graph connectivity while also making sure the fraction of systems/vehicles in the scene/ecosystem on the network remains reasonable.

The model trainer 964 can train a machine-learned model 914 and/or 962 based on a set of training data 966. The training data 966 can include a simulated vehicle-to-vehicle dataset that can be created using a sensor simulation system. The sensor simulation system can be included in or separate from machine-learning computing system 950. The sensor simulation system can use a large catalog of 3D static scenes and dynamic objects that are built upon real-world data collections to provide a set of rich and diverse assets from which to simulate new scenarios. The sensor simulation system can apply raycasting and machine learning to generate a realistic sensor point cloud such as, for example, a LIDAR point cloud. The sensor simulation system can allow for the creation of vehicle-to-vehicle scenes where a percentage of the vehicles are autonomous vehicles and generate realistic sensor data (e.g., LIDAR data) at different vehicle locations.

The simulations can be based on snippets (e.g., 25-second snippets, etc.) of labeled data recorded by a vehicle (e.g., autonomous vehicle) in the real world, which contains temporal tracks of the bounding boxes of all agents in the scene with respect to the recording vehicle. To generate the simulated vehicle-to-vehicle dataset, a real-world snippet can be recreated in a simulated virtual world using these ground-truth tracks. By using the same scenario layouts and agent trajectories recorded from the real world, the simulation system can replicate realistic traffic and vehicle motion for vehicle-to-vehicle dataset generation. At each timestep, actor 3D-assets can be placed into the virtual scene according to real-world labels and generate the sensor data (e.g., LIDAR point cloud data, etc.) at different candidate vehicle locations. Candidate autonomous vehicles can be non-parked vehicles that are within a communication range (e.g., a 50-meter broadcast range) of a subject vehicle in the scene (e.g., the autonomous vehicle that recorded the snippet in the real-world). This data generation approach allows for the generation of more realistic and diverse topologies of vehicle-to-vehicle communication networks.

In some implementations, the training data 966 can be taken from the same vehicle as that which utilizes the model(s) 914/962. In this way, the models 914/962 can be trained to determine outputs in a manner that is tailored to that particular system/vehicle. Additionally, or alternatively, the training data 966 can be taken from one or more different vehicles than that which is utilizing that model 914/962. The model trainer 964 can be implemented in hardware, firmware, and/or software controlling one or more processors.

The network(s) 975 can be any type of network or combination of networks that allows for communication between devices. In some embodiments, the network(s) 975 can include one or more of a local area network, wide area network, the Internet, secure network, cellular network, mesh network, peer-to-peer communication link and/or some combination thereof and can include any number of wired or wireless links. Communication over the network(s) 975 can be accomplished, for instance, via a network interface using any type of protocol, protection scheme, encoding, format, packaging, etc.

FIG. 9 illustrates one example system 900 that can be used to implement the present disclosure. Other computing systems can be used as well. For example, in some implementations, the computing system 925 can include the model trainer 964 and the training dataset 966. In such implementations, the machine-learned models 914/962 can be both trained and used locally at the computing system 925 (e.g., at a vehicle).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

It should be understood that each autonomous vehicle within the ecosystem (e.g., within a communication range) can perform the functions of a transmitter autonomous vehicle and the functions of a recipient autonomous vehicle as described above. As such, an autonomous vehicle can not only communicate compressed intermediate environmental representations to other autonomous vehicles but can also receive compressed intermediate environmental representations from other autonomous vehicles. In some implementations, the autonomous vehicle(s) can also, or alternatively, send and receive autonomy outputs (e.g., of the joint perception/prediction model) among one another.

What is claimed is:

1. A computer-implemented method, the method comprising:

generating, based at least in part on first data that describes outputs from a first sensor of a first vehicle, one or more first representations of a first portion of an environment of the first vehicle;

receiving one or more second representations of a second portion of the environment that overlaps the first portion of the environment, the one or more second representations generated using second data that describes outputs from a second sensor of a second vehicle;

generating, by a first model trained to regress relative poses based on input representations, and based at least in part on the one or more first representations and the one or more second representations, a first model output;

generating, based at least in part on the first model output, a first pose, wherein the first pose describes a first relative pose for the first vehicle and the second vehicle;

generating, based at least in part on the first pose, a second pose that describes an absolute pose for the first vehicle;

generating, based at least in part on the first pose, a third pose that describes an absolute pose for the second vehicle;

generating a fourth pose based at least in part on the first pose, the second pose, and the third pose, wherein the fourth pose describes a second relative pose for the first vehicle and the second vehicle;

generating one or more third representations of a third portion of the environment based at least in part on the one or more first representations, the one or more second representations, and the fourth pose;

generating, by a second model trained to generate outputs that predict attributes of objects based on input representations that describe environments, and based at least in part on the one or more third representations, a second model output;

generating, based at least in part on the second model output, third data that describes an attribute for an object in the environment; and controlling the first vehicle based at least in part on the third data.

2. The computer-implemented method of claim 1, comprising:

receiving the one or more second representations from the second vehicle.

3. The computer-implemented method of claim 1, comprising:

warping at least a portion of the one or more second representations based at least in part on the fourth pose into a warped representation; and generating the one or more third representations based at least in part on the warped representation.

4. The computer-implemented method of claim 3, comprising:

generating, by a third model trained to aggregate representations of environments, a third model output;

aggregating, based at least in part on the third model output, the one or more first representations and the warped representation.

5. The computer-implemented method of claim 1, wherein the third portion of the environment comprises at least a portion of the second portion of the environment that is not included in the first portion of the environment.

6. The computer-implemented method of claim 5, wherein the third portion of the environment corresponds to a union of the first portion of the environment and the second portion of the environment.

7. The computer-implemented method of claim 1, wherein:

at least one of the one or more first representations is a first feature map encoded with a first plurality of encoded features representative of the first portion of the environment; and at least one of the one or more second representations is a second feature map encoded with a second plurality of encoded features representative of the second portion of the environment.

8. The computer-implemented method of claim 1, wherein the attribute corresponds to a bounding box for an object in the environment.

9. A computing system comprising:

one or more processors; and one or more non-transitory computer-readable media that store instructions that are executable by the one or more processors to cause the computing system to perform operations, the operations comprising:

generating, based at least in part on first data that describes outputs from a first sensor of a first vehicle, one or more first representations of a first portion of an environment of the first vehicle;

receiving one or more second representations of a second portion of the environment that overlaps the first portion of the environment, the one or more second representations generated using second data that describes outputs from a second sensor of a second vehicle;

generating, by a first model trained to regress relative poses based on input representations, and based at least in part on the one or more first representations and the one or more second representations, a first model output;

generating, based at least in part on the first model output, a first pose, wherein the first pose describes a first relative pose for the first vehicle and the second vehicle;

generating, based at least in part on the first pose, a second pose that describes an absolute pose for the first vehicle;

generating, based at least in part on the first pose, a third pose that describes an absolute pose for the second vehicle;

generating a fourth pose based at least in part on the first pose, the second pose, and the third pose, wherein the fourth pose describes a second relative pose for the first vehicle and the second vehicle;

generating one or more third representations of a third portion of the environment based at least in part on the one or more first representations, the one or more second representations, and the fourth pose;

generating, by a second model trained to generate outputs that predict attributes of objects based on input representations that describe environments, and based at least in part on the one or more third representations, a second model output;

generating, based at least in part on the second model output, third data that describes an attribute for an object in the environment; and controlling the first vehicle based at least in part on the third data.

10. The computing system of claim 9, wherein the computing system is onboard the first vehicle.

11. The computing system of claim 9, the operations comprising:

receiving the one or more second representations from the second vehicle.

12. The computing system of claim 9, the operations comprising:

warping at least a portion of the one or more second representations based at least in part on the fourth pose into a warped representation; and generating the one or more third representations based at least in part on the warped representation.

13. The computing system of claim 12, the operations comprising:

generating, by a third model trained to aggregate representations of environments, a third model output;

aggregating, based at least in part on the third model output, the one or more first representations and the warped representation.

14. The computing system of claim 9, wherein the third portion of the environment comprises at least a portion of the second portion of the environment that is not included in the first portion of the environment.

15. The computing system of claim 9, wherein:

at least one of the one or more first representations is a first feature map encoded with a first plurality of encoded features representative of the first portion of the environment; and at least one of the one or more second representations is a second feature map encoded with a second plurality of encoded features representative of the second portion of the environment.

16. The computing system of claim 9, wherein the attribute corresponds to a bounding box for an object in the environment.

17. An autonomous vehicle comprising:

one or more processors; and one or more non-transitory computer-readable media that store instructions that are executable by the one or more processors to cause the autonomous vehicle to perform operations, the operations comprising:

generating, based at least in part on first data that describes outputs from a first sensor of the autonomous vehicle, one or more first representations of a first portion of an environment of the autonomous vehicle;

receiving one or more second representations of a second portion of the environment that overlaps the first portion of the environment, the one or more second representations generated using second data that describes outputs from a second sensor of a second vehicle;

generating, by a first model trained to regress relative poses based on input representations, and based at least in part on the one or more first representations and the one or more second representations, a first model output;

generating, based at least in part on the first model output, a first pose, wherein the first pose describes a first relative pose for the autonomous vehicle and the second vehicle;

generating, based at least in part on the first pose, a second pose that describes an absolute pose for the autonomous vehicle;

generating, based at least in part on the first pose, a third pose that describes an absolute pose for the second vehicle;

generating a fourth pose based at least in part on the first pose, the second pose, and the third pose, wherein the fourth pose describes a second relative pose for the autonomous vehicle and the second vehicle;

generating one or more third representations of a third portion of the environment based at least in part on the one or more first representations, the one or more second representations, and the fourth pose;

generating, by a second model trained to generate outputs that predict attributes of objects based on input representations that describe environments, and based at least in part on the one or more third representations, a second model output;

generating, based at least in part on the second model output, third data that describes an attribute for an object in the environment; and controlling the autonomous vehicle based at least in part on the third data.

18. The autonomous vehicle of claim 17, the operations comprising:

receiving the one or more second representations from the second vehicle.

19. The autonomous vehicle of claim 17, wherein the third portion of the environment comprises at least a portion of the second portion of the environment that is not included in the first portion of the environment.

20. The autonomous vehicle of claim 17, the operations comprising:

warping at least a portion of the one or more second representations based at least in part on the fourth pose into a warped representation;

generating, by a third model trained to aggregate representations of environments, a third model output; and aggregating, based at least in part on the third model output, the one or more first representations and the warped representation into the one or more third representations.

* * * * *